US012550763B2

(12) United States Patent
Hayashi

(10) Patent No.: US 12,550,763 B2
(45) Date of Patent: Feb. 10, 2026

(54) OPTICAL TRANSMISSION DEVICE HAVING COOLING UNITS AND COOLING PLATE HAVING COOLING UNITS

(71) Applicant: Fujitsu Limited, Kawasaki (JP)

(72) Inventor: Nobuyuki Hayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 18/191,046

(22) Filed: Mar. 28, 2023

(65) Prior Publication Data

US 2023/0411270 A1 Dec. 21, 2023

(30) Foreign Application Priority Data

Jun. 21, 2022 (JP) ................................ 2022-099414

(51) Int. Cl.

| | |
|---|---|
| ***H01L 23/498*** | (2006.01) |
| ***H01L 23/367*** | (2006.01) |
| ***H01R 12/70*** | (2011.01) |
| ***H04B 10/50*** | (2013.01) |
| ***H05K 7/20*** | (2006.01) |

(52) U.S. Cl.

CPC .... *H01L 23/49838* (2013.01); *H01L 23/3675* (2013.01); *H01R 12/7076* (2013.01); *H04B 10/501* (2013.01); *H05K 7/20509* (2013.01)

(58) Field of Classification Search

CPC .......... H01L 23/49838; H01L 23/3675; H01R 12/7076; H04B 10/501; H05K 7/20509

See application file for complete search history.

(56) References Cited

U.S. PATENT DOCUMENTS

2008/0100899 A1* 5/2008 Shimokawa .......... B81B 3/0086 156/60
2014/0063740 A1 3/2014 Sunaga et al.
2021/0280566 A1* 9/2021 Pothukuchi ........... H01L 25/167

FOREIGN PATENT DOCUMENTS

JP 2011-257660 A 12/2011
JP 2014-49691 A 3/2014

* cited by examiner

*Primary Examiner* — Michael Jung

(74) *Attorney, Agent, or Firm* — Fujitsu Intellectual Property Center

(57) ABSTRACT

An optical transmission device includes a substrate that includes a first surface, a switch-integrated-circuit chip, a first connector coupled to the chip, a second connector provided between the chip and the first connector, a first optical-module coupled to the first connector, a second optical-module coupled to the second connector, and a cooling plate that includes a first cooling-unit that cools the chip, and a second cooling-unit that cools the first and second optical-modules, wherein the second cooling-unit includes second and third surfaces, the second and third surfaces are inclined such that distances between the first surface and the second and third surfaces reduce as distances between the chip and the second and third surfaces reduce, respectively, wherein the second surface is closer to the first surface than the third surface, wherein the first and second optical-modules are provided over the second and third surfaces, respectively.

16 Claims, 28 Drawing Sheets

1

161 114 165 162 150 120 θ3 120 164 113 110 112 111 θ2 140

2
110
120
150
161
260
262
140
XIX 348
358
342
340
120
167
120
348
358
120
348
161
160
162
358
375
166
373
120
358
348
352

4
110
371
440
120
120
120
120
120
120
161
160
162
120
120
372
373
120
120
XXVI
XXVI

OPTICAL TRANSMISSION DEVICE HAVING COOLING UNITS AND COOLING PLATE HAVING COOLING UNITS

CROSS-REFERENCE TO RELATED APPLICATION

This application is based upon and claims the benefit of priority of the prior Japanese Patent Application No. 2022-99414, filed on Jun. 21, 2022, the entire contents of which are incorporated herein by reference.

FIELD

The embodiments discussed herein are related to an optical transmission device and a cooling plate.

BACKGROUND

As one of optical transmission devices, there is co-packaged optics (CPO) in which a switch integrated circuit chip (switch IC) and optical modules are mounted over a package substrate. In the CPO, a plurality of optical modules are arranged along four sides of a package substrate having a rectangular planar shape. With the CPO, wiring between the switch IC and the optical modules is short, and accordingly, power consumption may be reduced.

Japanese Laid-open Patent Publication Nos. 2014-49691 and 2011-257660 are described as related art.

SUMMARY

According to an aspect of the embodiments, an optical transmission device includes a wiring substrate that includes a first surface, a switch integrated circuit chip provided over the first surface, a first connector provided over the first surface and coupled to the switch integrated circuit chip via the wiring substrate, a second connector provided between the switch integrated circuit chip and the first connector and coupled to the switch integrated circuit chip via the wiring substrate, a first optical module electrically coupled to the first connector, a second optical module electrically coupled to the second connector, and a cooling plate that includes a first cooling unit that cools the switch integrated circuit chip, and a second cooling unit that cools the first optical module and the second optical module, wherein the second cooling unit includes a second surface and a third surface, the second surface is inclined such that, in sectional view seen in the direction parallel to the first surface, a distance between the first surface and the second surface reduces as a distance between the switch integrated circuit chip and the second surface reduces, and the third surface is inclined such that, in sectional view seen in a direction parallel to the first surface, a distance between the first surface and the third surface reduces as a distance between the switch integrated circuit chip and the third surface reduces, wherein the second surface is closer to the first surface than the third surface, wherein the first optical module is provided over the second surface, and wherein the second optical module is provided over the third surface.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the configuration of the CPO of related art, in a case where a large number of optical modules are disposed along each side of the package substrate, an increase in the size of the package substrate is unavoidable. The size of a member that cools the switch IC and the optical modules also increases. The distance between the switch IC and the optical modules depends on the size and the number of the optical modules mounted over the package substrate. Thus, in a case where a large number of optical modules having a certain size are arranged along each side of the package substrate, wiring between the switch IC and the optical modules is longer than the distance between the side of the package substrate and the switch IC.

Hereinafter, embodiments of techniques of providing an optical transmission device that may suppress an increase in the size of a package substrate caused by an increase in the number of optical modules will be described in detail with reference to accompanying drawings. In the specification and drawings, elements having substantially the same functional configurations are denoted by the same numerals, and thereby redundant description thereof is omitted.

First Embodiment

Figure 1:
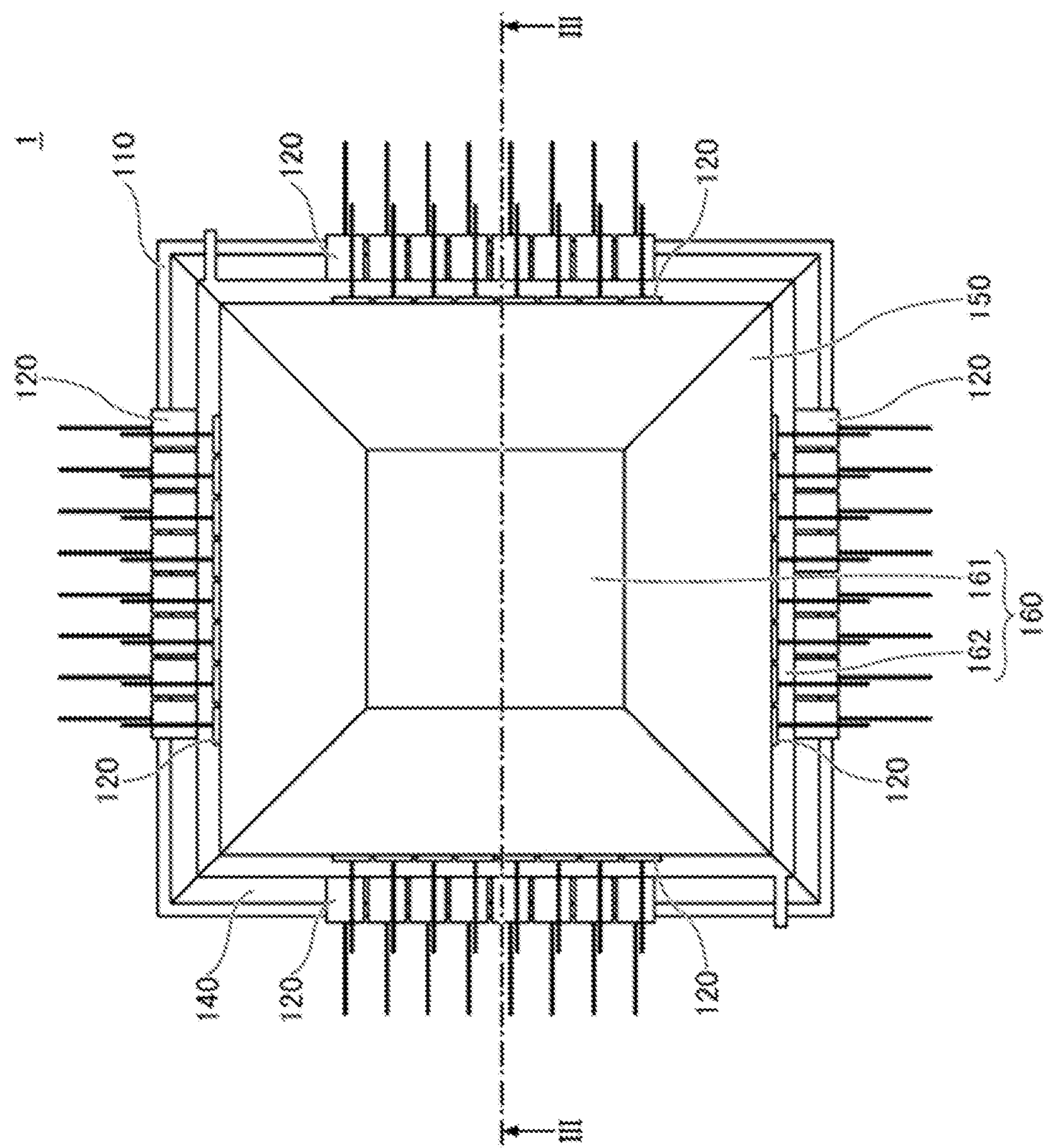
FIG. 1 is a top view illustrating an optical transmission device according to a first embodiment.
Figure 2:
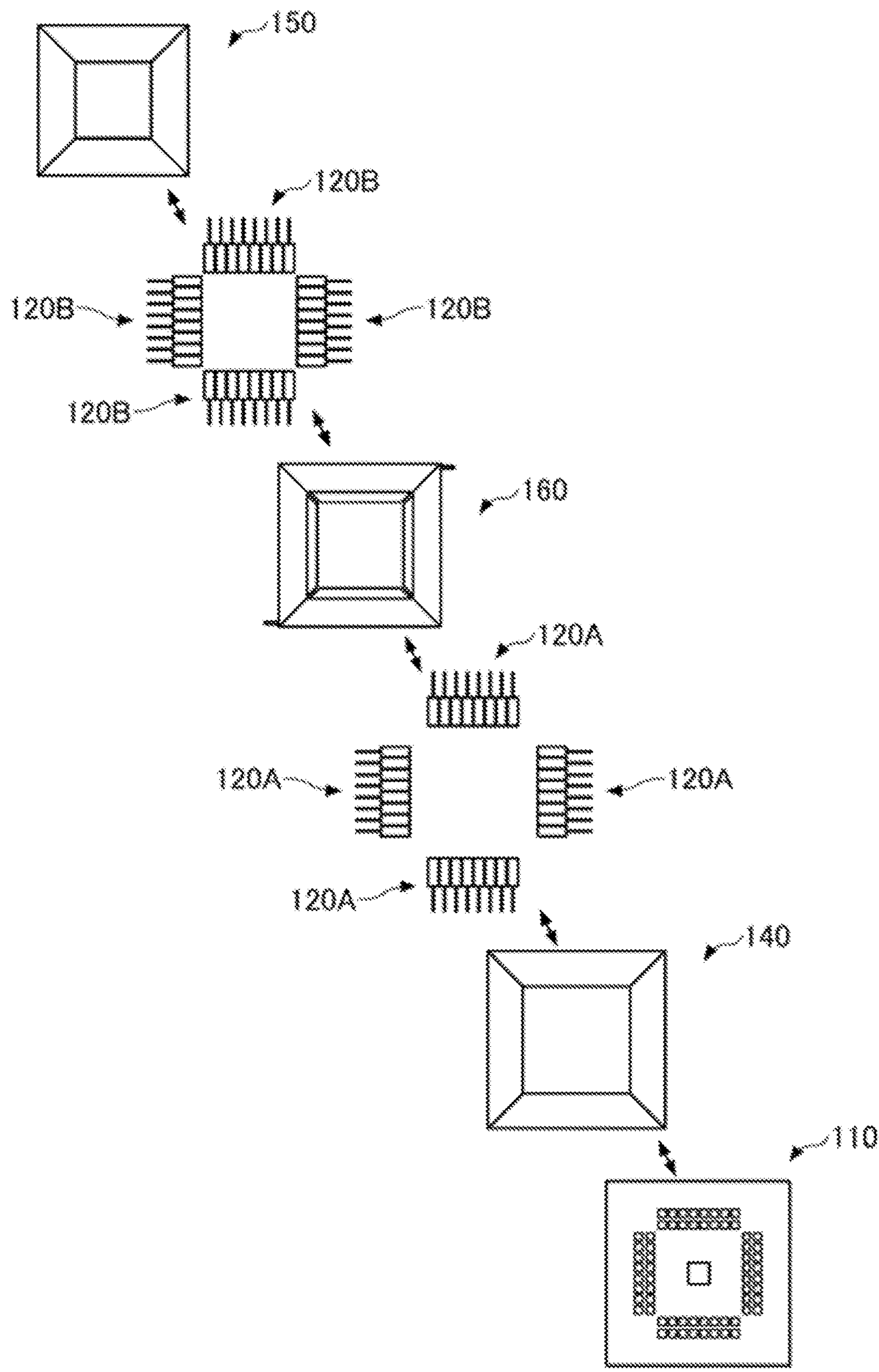
FIG. 2 is an exploded top view illustrating the optical transmission device according to the first embodiment.
Figure 3:
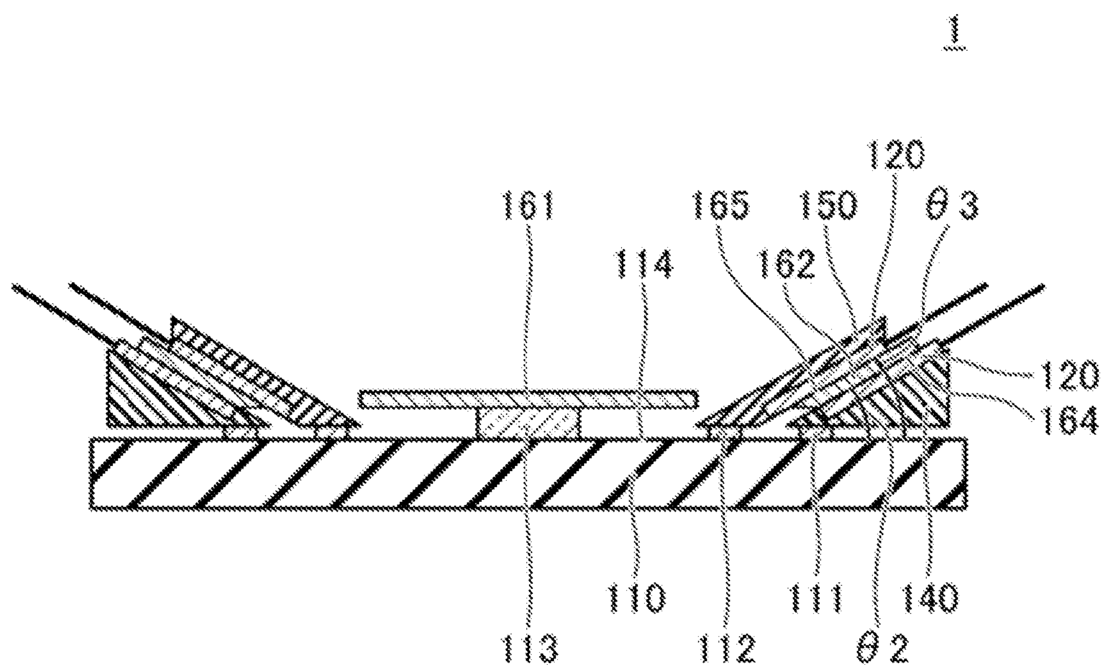
FIG. 3 is a sectional view illustrating the optical transmission device according to the first embodiment.

A first embodiment is described. The first embodiment is related to an optical transmission device. FIG. 1 is a top view illustrating the optical transmission device according to the first embodiment. FIG. 2 is an exploded top view illustrating the optical transmission device according to the first embodiment. FIG. 3 is a sectional view illustrating the optical transmission device according to the first embodiment. FIG. 3 corresponds to a sectional view taken along line III-III of FIG. 1.

As illustrated in FIGS. 1 to 3, an optical transmission device 1 according to the first embodiment includes a package substrate 110, a third connector 140, four optical module groups 120A, a cooling plate 160, four optical module groups 120B, and a fourth connector 150. The optical module groups 120A include a plurality of optical modules 120, and the optical module groups 120B include a plurality of the optical modules 120. For example, each optical module group 120A includes eight optical modules 120, and each optical module group 120B includes eight optical modules 120. For example, the optical transmission device 1 includes 64 optical modules 120. Each of the optical modules 120 included in the optical module group 120A is an example of a first optical module, and each of the optical modules 120 included in the optical module group 120B is an example of a second optical module.

Figure 4:
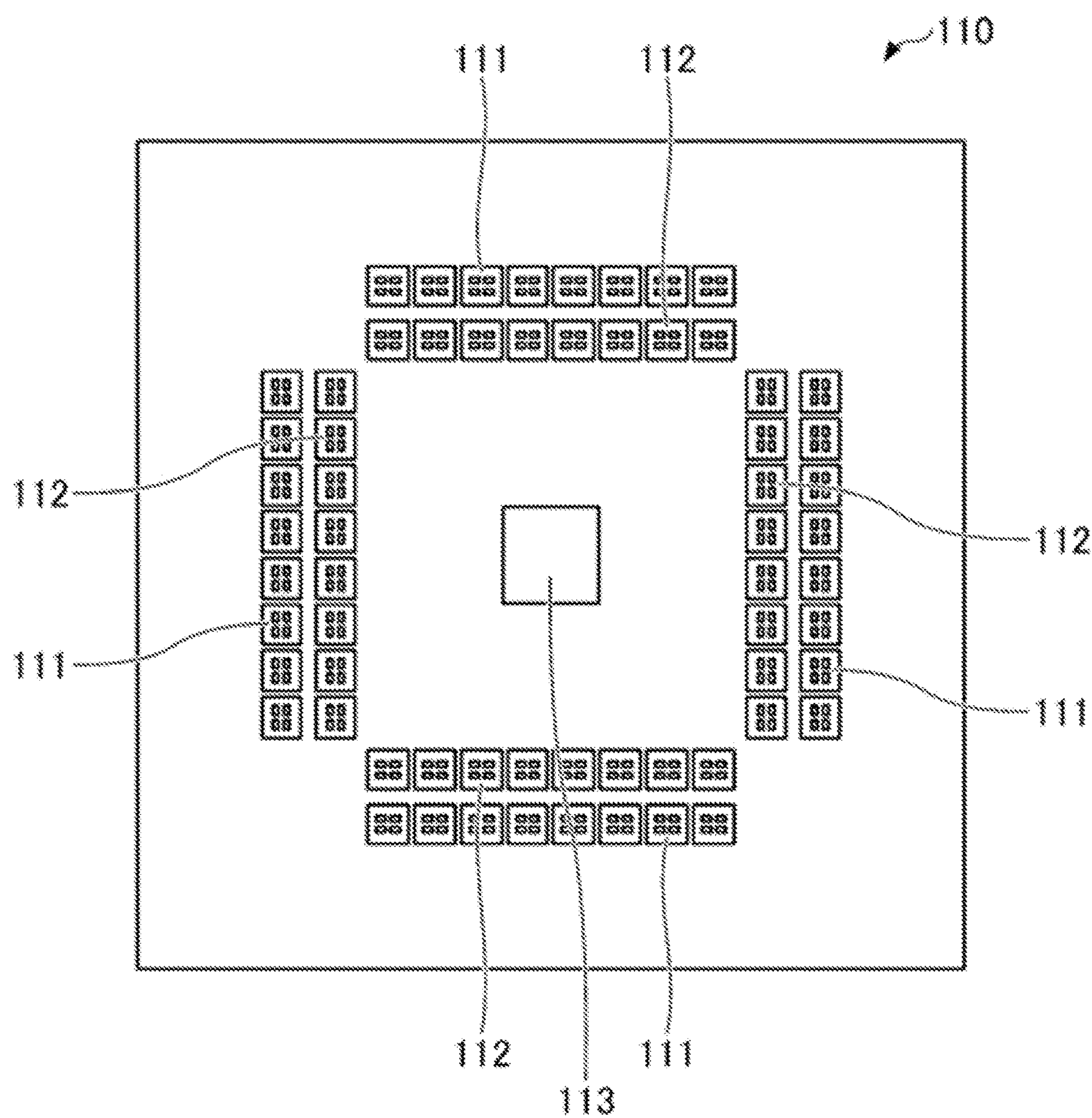
FIG. 4 is a top view illustrating the package substrate according to the first embodiment.

FIG. 4 is a top view illustrating the package substrate 110 according to the first embodiment. The package substrate 110 has a rectangular planar shape. The package substrate 110 is a wiring substrate. The package substrate 110 has an upper surface 114. A switch integrated circuit chip (switch IC) 113 is mounted at the center of the upper surface 114. A plurality of first connectors 111 and a plurality of second connectors 112 are attached to the upper surface 114. The number of the first connectors 111 is equal to a total number of the optical modules 120 included in the four optical module groups 120A, and the number of the second connectors 112 is equal to a total number of the optical modules 120 included in the four optical module groups 120B. The first connectors 111 and the second connectors 112 are coupled to the switch IC 113 via the package substrate 110. The first connectors 111 and the second connectors 112 are, for example, female connectors. The plurality of first connectors 111 and the plurality of second connectors 112 form a quadrilateral shape in plan view seen in a direction perpendicular to the upper surface 114 and is disposed so as to form an annular shape surrounding the switch IC 113. For example, the plurality of first connectors 111 and the plurality of second connectors 112 are arranged such that each of the four sides is formed by eight of the plurality of first connectors 111 and eight of the plurality of second connectors 112. The second connectors 112 are provided between the switch IC 113 and the first connectors 111. The upper surface 114 is an example of a first surface.

Figure 5:
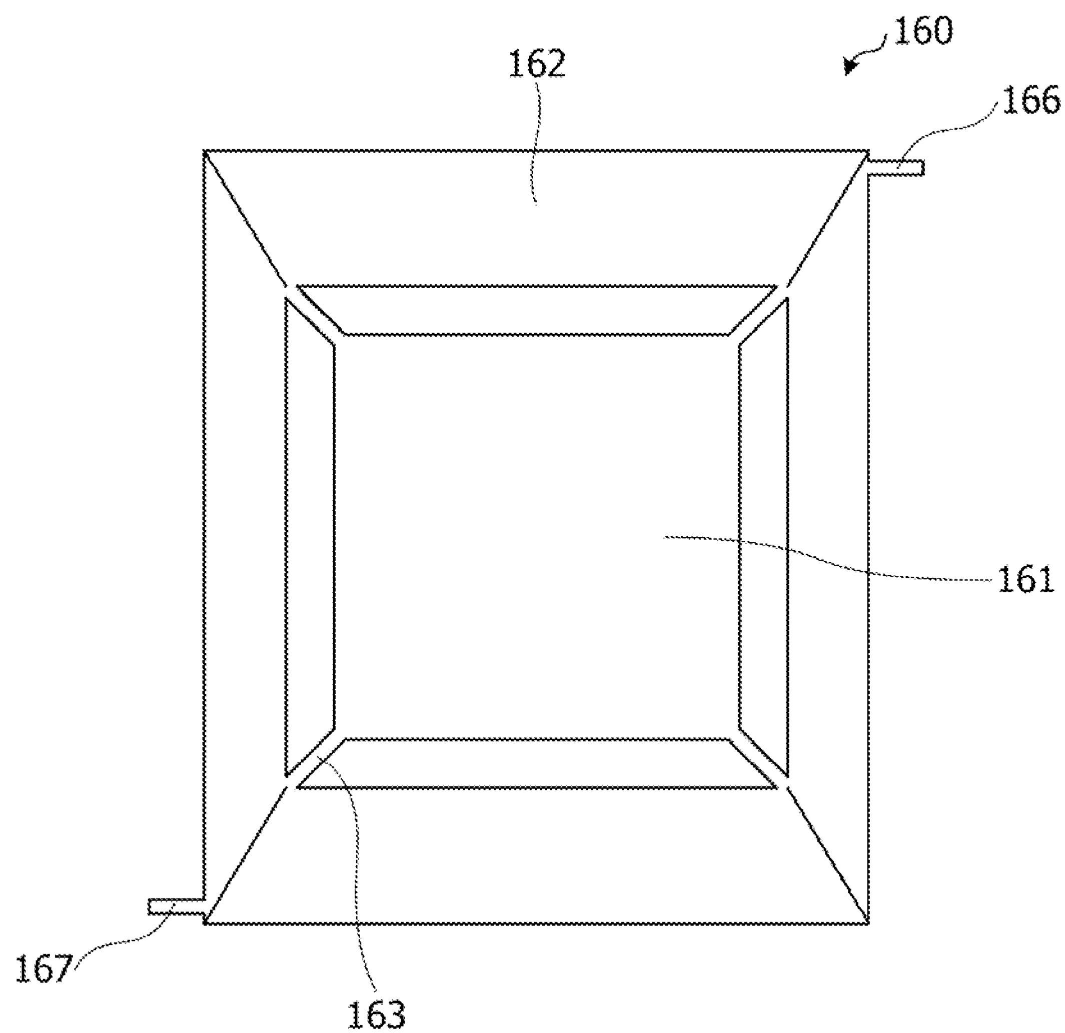
FIG. 5 is a top view illustrating a cooling plate according to the first embodiment.

FIG. 5 is a top view illustrating the cooling plate 160. The cooling plate 160 includes a first cooling unit 161 that cools the switch IC, a second cooling unit 162 that cools the optical modules 120, and a coupling unit 163 that couples the first cooling unit 161 and the second cooling unit 162 to each other. The first cooling unit 161 has a rectangular planar shape. The first cooling unit 161 is located inside the second connectors 112 in plan view. In plan view, the second cooling unit 162 has a quadrilateral shape and has an annular shape surrounding the first cooling unit 161. As illustrated in FIG. 3, the second cooling unit 162 has inclined surfaces 164 and 165. The inclined surface 164 is inclined such that, in sectional view seen in a direction parallel to the upper surface 114, as the distance between the switch IC 113 and the inclined surface 164 reduces, the distance between the upper surface 114 and the inclined surface 164 reduces, and, in sectional view seen in the direction parallel to the upper surface 114, as the distance between the switch IC 113 and the inclined surface 165 reduces, the distance between the upper surface 114 and the inclined surface 165 reduces. The inclined surface 164 is closer to the upper surface 114 than the inclined surface 165. According to the present embodiment, the inclined surfaces 164 and 165 are parallel to each other, and an angle θ2 formed between the upper surface 114 and the inclined surface 164 is equal to an angle θ3 formed between the upper surface 114 and the inclined surface 165. The angles θ2 and θ3 are greater than 0° and smaller than 90°, and preferably, greater than or equal to 10° and smaller than or equal to 80°. The inclined surface 164 is an example of a second surface, and the inclined surface 165 is an example of a third surface.

The cooling plate 160 also includes an inlet 166 and an outlet 167 that communicate with the second cooling unit 162. A cooling medium such as water is supplied from the inlet 166 to the second cooling unit 162, and the cooling medium is supplied to the first cooling unit 161 through the coupling unit 163. The cooling medium supplied to the first cooling unit 161 is discharged from the outlet 167 through the coupling unit 163 and the second cooling unit 162.

Figure 6:
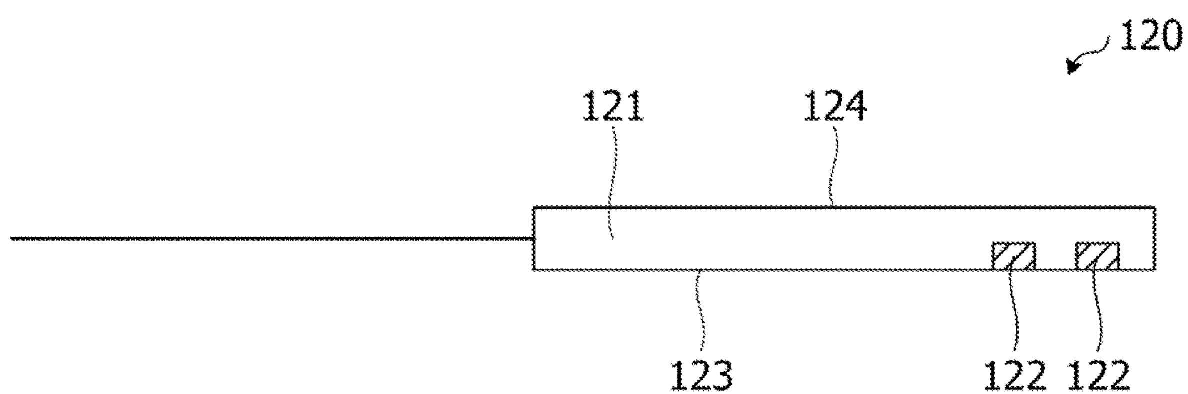
FIG. 6 is a sectional view illustrating an optical module.

FIG. 6 is a sectional view illustrating an optical module 120. The optical module 120 includes a main body 121 and terminals 122. The main body 121 has flat surfaces 123 and 124 parallel to each other. The terminals 122 are provided in the flat surface 123. The flat surface 124 is in contact with the second cooling unit 162 of the cooling plate 160.

Figure 7:
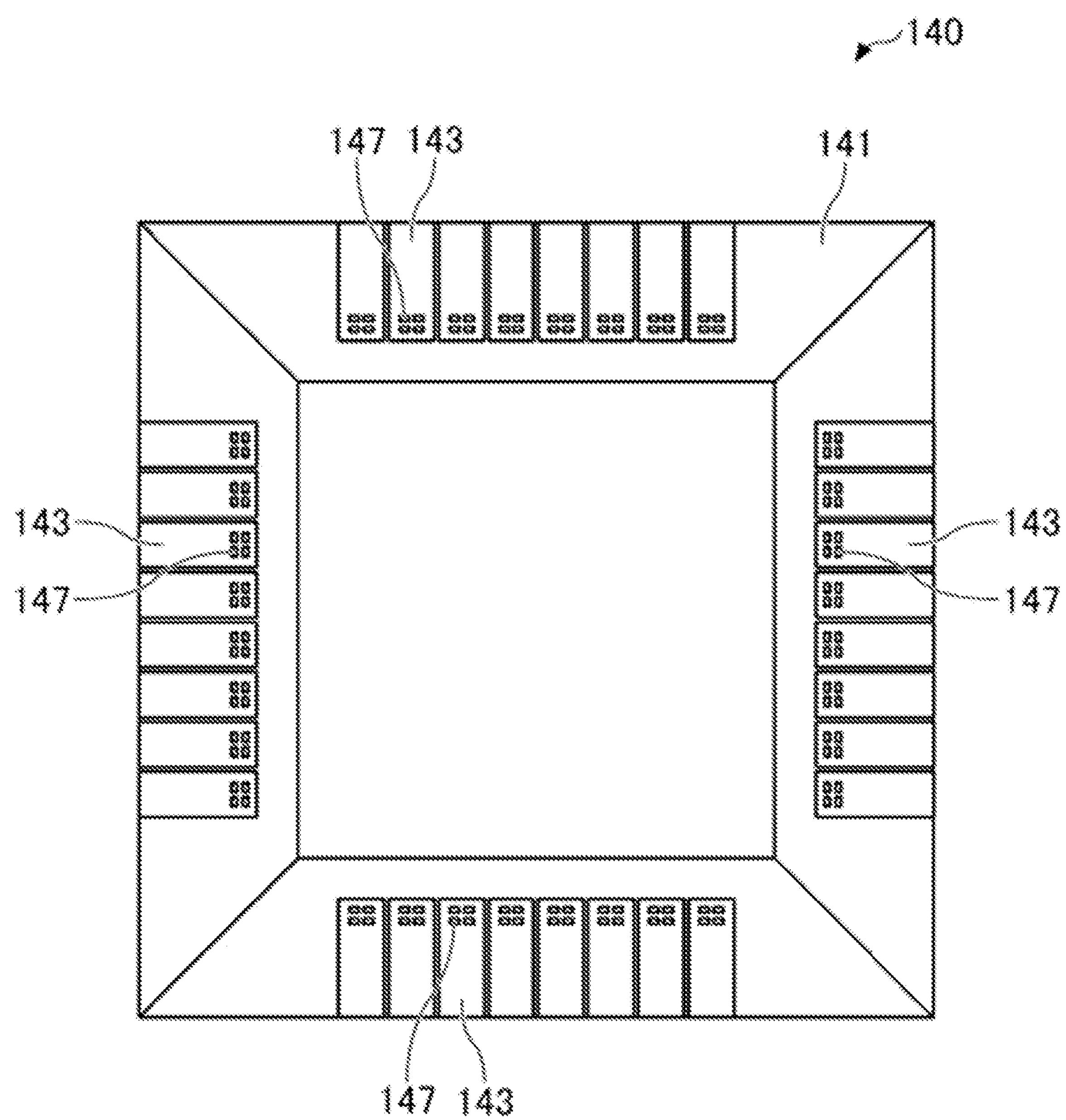
FIG. 7 is a top view illustrating a third connector according to the first embodiment.
Figure 8:
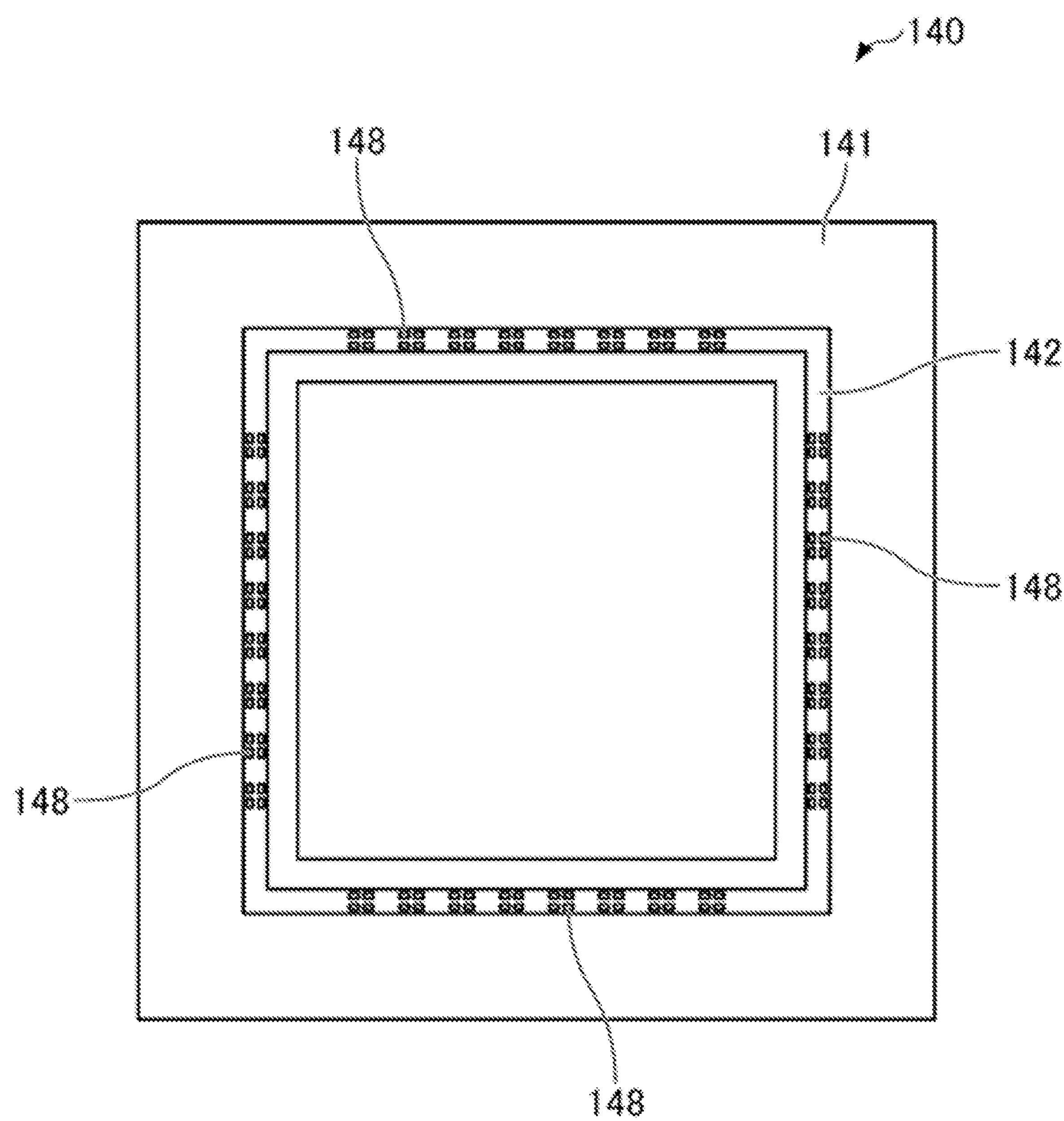
FIG. 8 is a bottom view illustrating the third connector according to the first embodiment.
Figure 9:
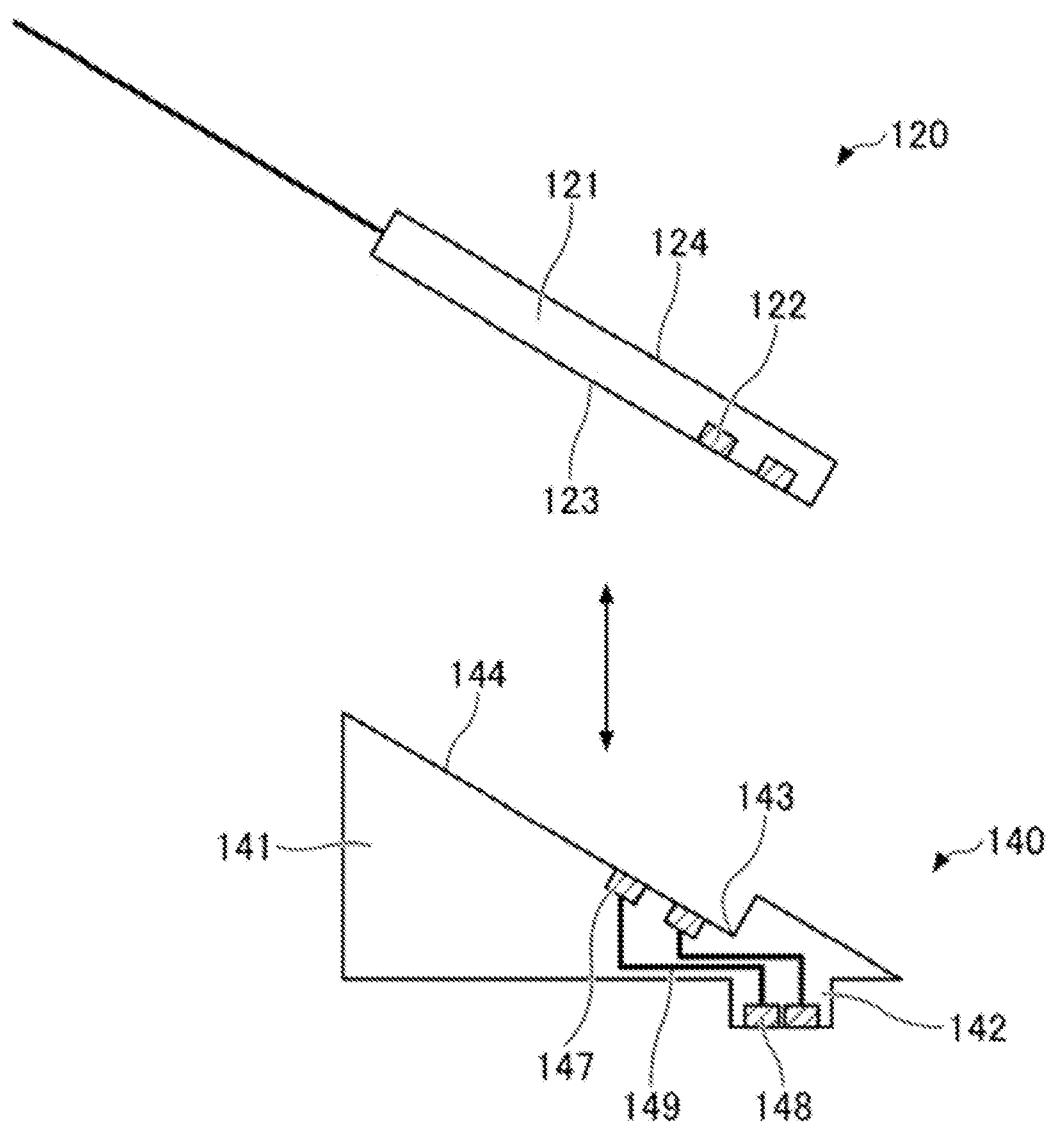
FIG. 9 is a sectional view illustrating the third connector according to the first embodiment.

FIG. 7 is a top view illustrating the third connector 140. FIG. 8 is a bottom view illustrating the third connector 140. FIG. 9 is a sectional view illustrating the third connector 140. The third connector 140 includes a base portion 141 and a projection portion 142. Examples of the material of the base portion 141 and the projection portion 142 include, for example, engineering plastics such as polyphenylene sulfide (PPS), polyamide, polybutylene terephthalate (PBT), and liquid crystal polymer (LCP). Housing portions 143 that house the optical modules 120 included in the optical module groups 120A are formed in the base portion 141. As many housing portions 143 as the number of the optical modules 120 included in the optical module groups 120A are formed. Each of the housing portions 143 has an inclined surface 144 parallel to the inclined surface 164. The inclined surface 144 is inclined such that, in sectional view seen in the direction parallel to the upper surface 114, as the distance between the switch IC 113 and the inclined surface 144 reduces, the distance between the inclined surface 144 and the upper surface 114 reduces. The projection portion 142 projects downward from the base portion 141. The third connector 140 includes terminals 147 in the inclined surfaces 144, terminals 148 in a lower surface of the projection portion 142, and conductive members 149 that couple the terminals 147 and the terminals 148 to each other. When the optical module 120 is housed in the housing portion 143, the terminals 122 are coupled to the terminals 147. The optical module 120 housed in the housing portion 143 is provided over the inclined surface 164 of the second cooling unit 162. The terminals 148 are coupled to terminals of the first connectors 111. The projection portion 142 in which the terminals 148 are provided functions as a male connector inserted into the first connectors 111. The inclined surface 144 is an example of a fourth surface.

Figure 10:
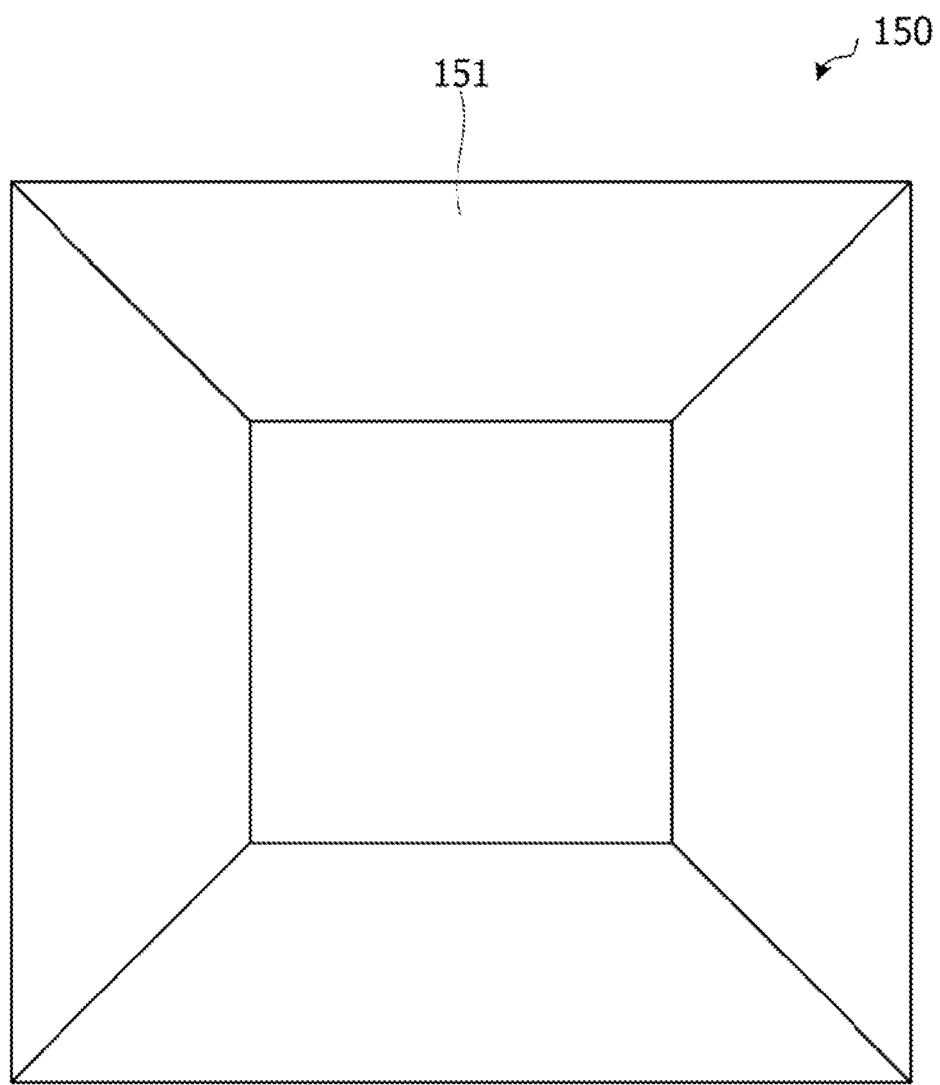
FIG. 10 is a top view illustrating a fourth connector according to the first embodiment.
Figure 11:
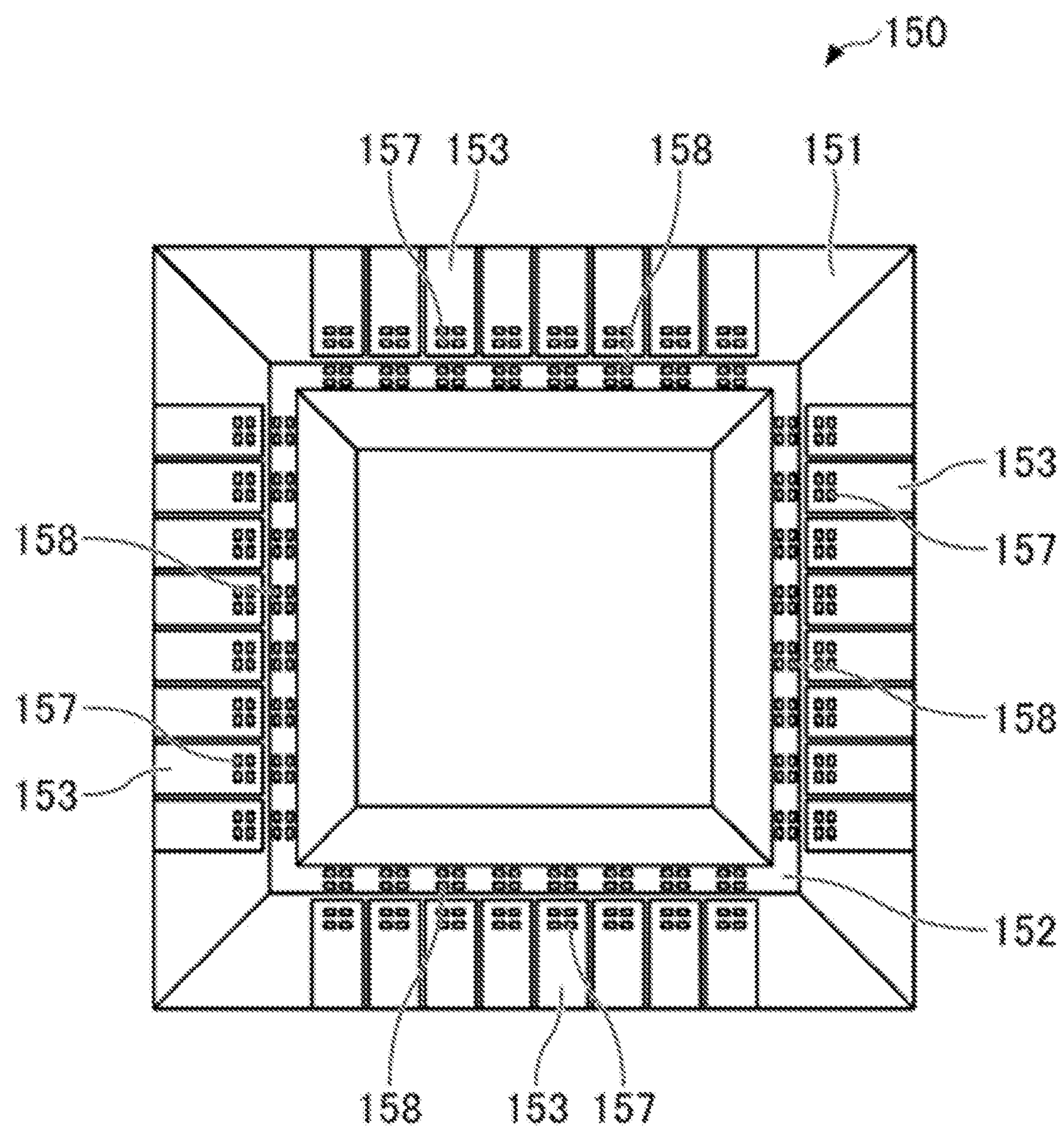
FIG. 11 is a bottom view illustrating the fourth connector according to the first embodiment.
Figure 12:
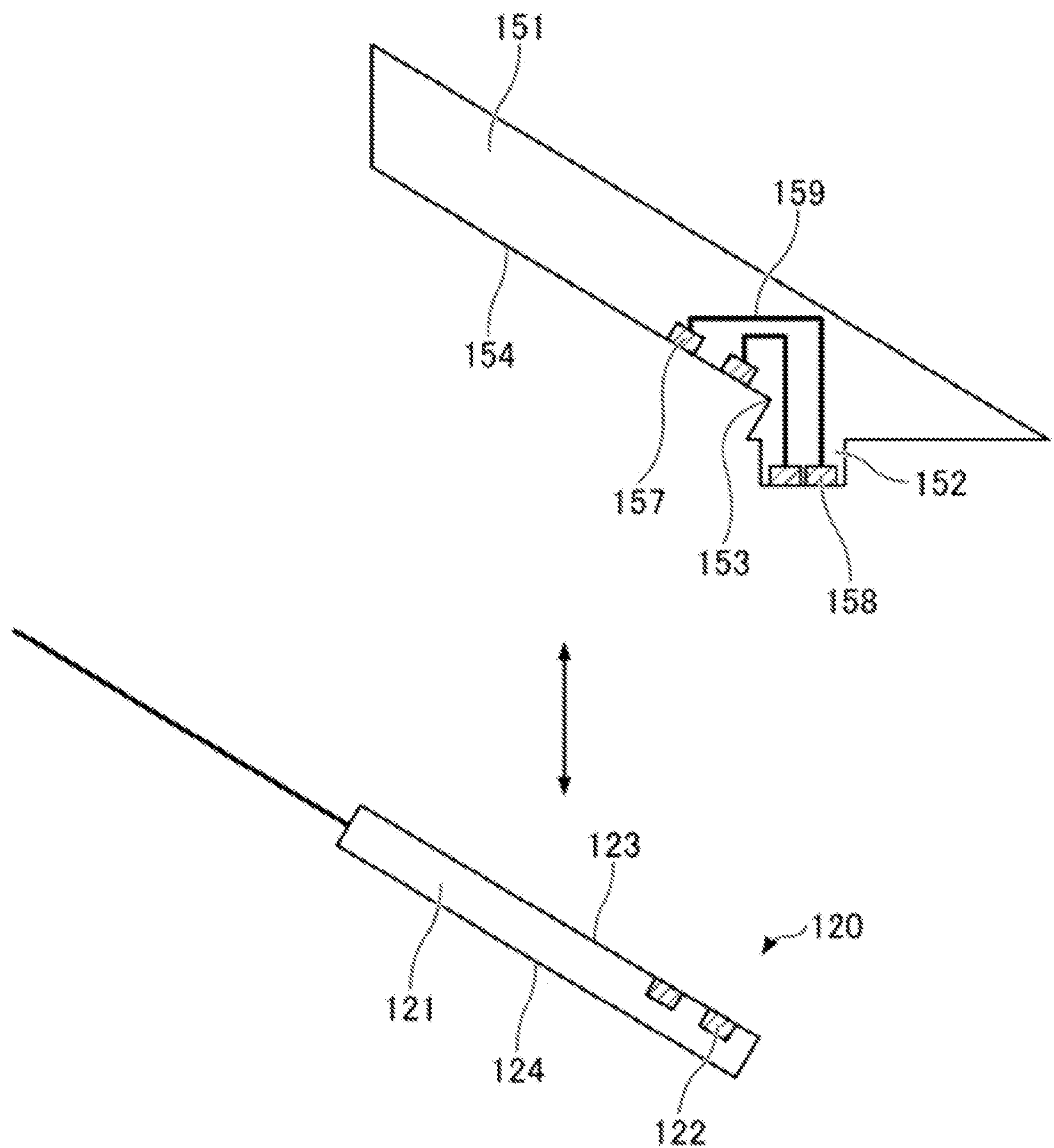
FIG. 12 is a sectional view illustrating the fourth connector according to the first embodiment.

FIG. 10 is a top view illustrating the fourth connector 150. FIG. 11 is a bottom view illustrating the fourth connector 150. FIG. 12 is a sectional view illustrating the fourth connector 150. The fourth connector 150 includes a base portion 151 and a projection portion 152. Examples of the material of the base portion 151 and the projection portion 152 include, for example, engineering plastics such as PPS, polyamide, PBT, and LCP. Housing portions 153 that house the optical modules 120 included in the optical module groups 120B are formed in the base portion 151. As many housing portions 153 as the number of the optical modules 120 included in the optical module groups 120B are formed. Each of the housing portions 153 has an inclined surface 154 parallel to the inclined surface 165. The inclined surface 154 is inclined such that, in sectional view seen in the direction parallel to the upper surface 114, as the distance between the switch IC 113 and the inclined surface 154 reduces, the distance between the inclined surface 154 and the upper surface 114 reduces. The projection portion 152 projects downward from the base portion 151. The fourth connector 150 includes terminals 157 in the inclined surfaces 154, terminals 158 in a lower surface of the projection portion 152, and conductive members 159 that couple the terminals 157 and the terminals 158 to each other. When the optical module 120 is housed in the housing portion 153, the terminals 122 are coupled to the terminals 157. The optical module 120 housed in the housing portion 153 is provided over the inclined surface 165 of the second cooling unit 162. The terminals 158 are coupled to terminals of the second connector 112. The projection portion 152 in which the terminals 158 are provided functions as a male connector inserted into the second connectors 112. The inclined surface 154 is an example of a fifth surface.

Figure 13:
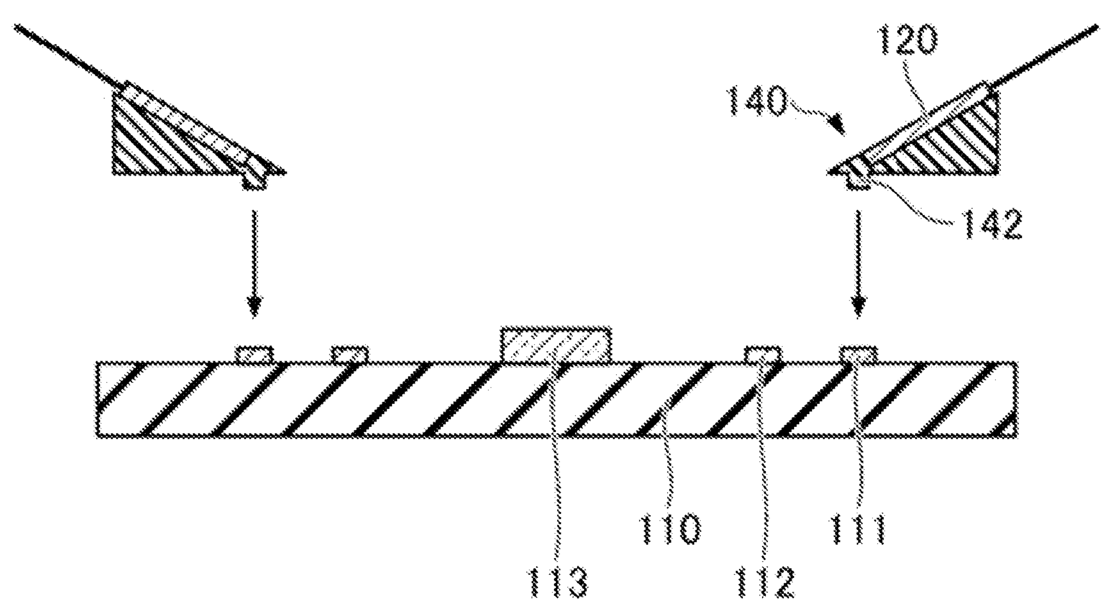
FIG. 13 is a sectional view (No. 1) illustrating a method of manufacturing the optical transmission device according to the first embodiment.
Figure 14:
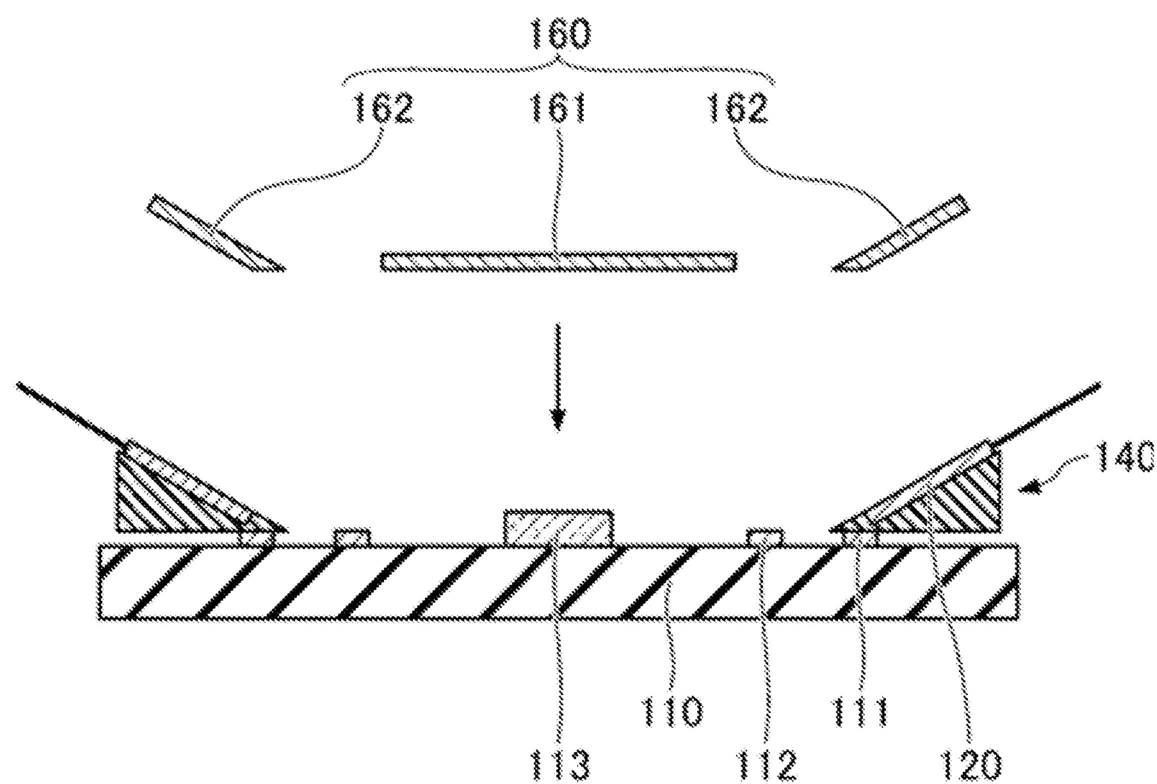
FIG. 14 is a sectional view (No. 2) illustrating the method of manufacturing the optical transmission device according to the first embodiment.
Figure 15:
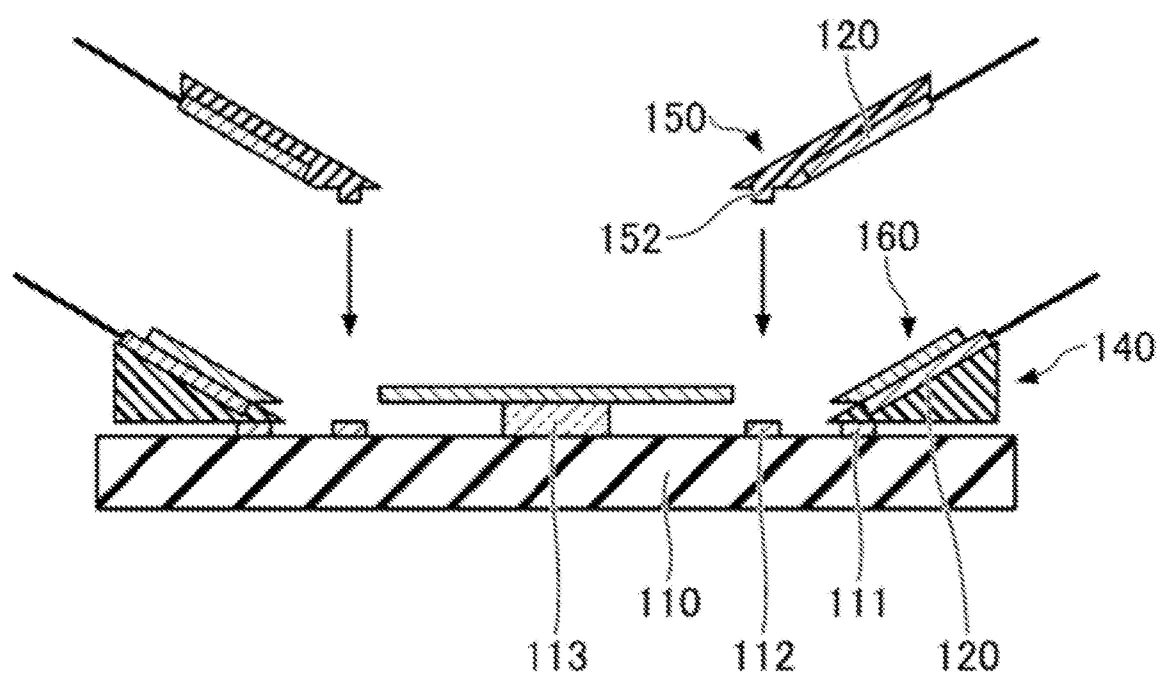
FIG. 15 is a sectional view (No. 3) illustrating the method of manufacturing the optical transmission device according to the first embodiment.

A method of manufacturing the optical transmission device 1 according to the first embodiment is described. FIGS. 13 to 15 are sectional views illustrating the method of manufacturing the optical transmission device 1 according to the first embodiment.

First, as illustrated in FIG. 13, the package substrate 110 to which the first connectors 111 and the second connectors 112 are attached and over which the switch IC 113 is mounted is prepared. The optical modules 120 included in the optical module groups 120A are attached to the respective housing portions 143 of the third connector 140.

Next, as illustrated in FIG. 14, the projection portion 142 is inserted into the first connectors 111. As a result, the optical modules 120 included in the optical module groups 120A are mounted over the package substrate 110. After that, the cooling plate 160 is prepared.

Next, as illustrated in FIG. 15, the cooling plate 160 is attached to the package substrate 110 such that the first cooling unit 161 is in contact with the switch IC 113 and the second cooling unit 162 is in contact with the optical modules 120 included in the optical module groups 120A. As illustrated in FIG. the optical modules 120 included in the optical module groups 120B are attached to the respective housing portions 153 of the fourth connector 150.

Next, the projection portion 152 is inserted into the second connectors 112. As a result, as illustrated in FIG. 3, the optical modules 120 included in the optical module groups 120B are mounted over the package substrate 110.

In this way, the optical transmission device 1 according to the first embodiment may be manufactured.

According to the first embodiment, the optical modules 120 are arranged in two rows along each side of the package substrate 110 having a rectangular shape in plan view. For example, in plan view, 32 optical modules 120 included in the four optical module groups 120A are arranged in an annular shape, and, inside 32 optical modules 120 described above, 32 optical modules 120 included in the four optical module groups 120B are arranged in an annular shape. Thus, an increase in the distance between the switch IC 113 and the optical modules 120 due to an increase in the number of optical modules 120 may be suppressed. Accordingly, the length of the wiring between the switch IC 113 and the optical modules 120 provided over the package substrate 110 may be reduced.

Figure 16:
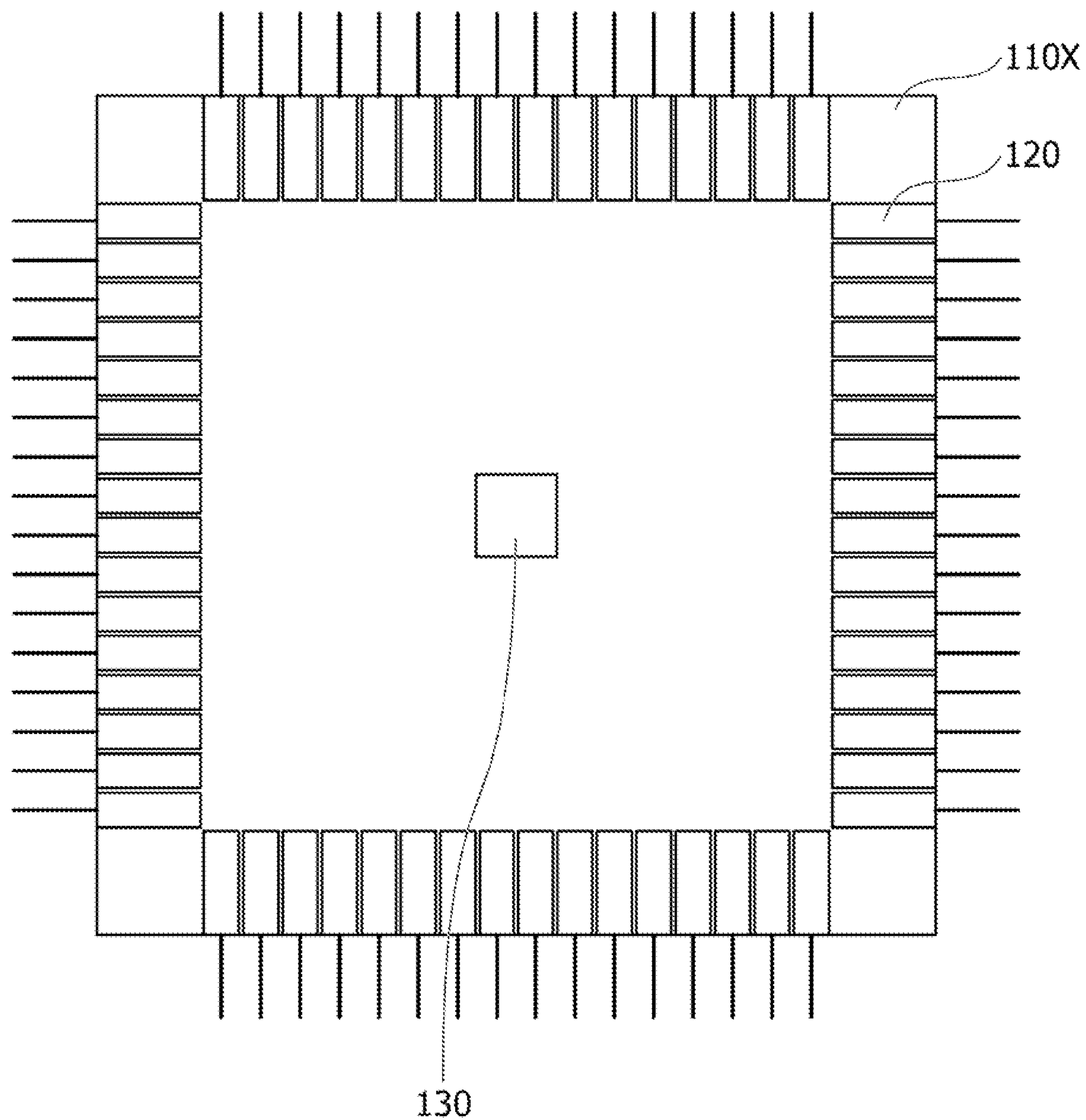
FIG. 16 is a diagram illustrating arrangement of optical modules in an optical transmission device according to a reference example.

According to the first embodiment, the size of the package substrate 110 may be reduced. FIG. 16 is a diagram illustrating arrangement of optical modules in an optical transmission device according to a reference example. In the optical transmission device according to the reference example illustrated in FIG. 16, 16 optical modules 120 are arranged in a single row along each side of a package substrate 110X having a rectangular shape in plan view. When it is assumed that the dimensions of the optical module 120 are 30 mm in the longitudinal direction and 14.3 mm in the transverse direction in plan view, the length of the side of the package substrate 110X is at least 469 mm according to the reference example. In contrast, according to the first embodiment, when it is assumed that the angles $\theta 2$ and $\theta 3$ are 30° and eight optical modules 120 are arranged in two rows along each side, the length of the side of the package substrate 110 is at least 304 mm. Thus, according to the first embodiment, the area of the package substrate may be reduced by about 42% compared to the reference example.

According to the present embodiment, even when a large number of optical modules 120 are mounted over the package substrate 110, the increase in the size of the package substrate 110 may be suppressed and the increase in the distance between the switch IC 113 and the optical modules 120 may be suppressed. Accordingly, the density of the optical modules 120 may be increased and the bandwidth may be improved.

The third connector 140, the cooling plate 160, and the fourth connector 150 having respective truncated square pyramid shapes are concentrically superposed on each other. Accordingly, high rigidity may be obtained. Since the alignment is performed in a self-aligning manner in manufacturing the optical transmission device 1, misalignment may be suppressed and high positional accuracy may be obtained. Accordingly, good close contact may be obtained between the optical module 120 and the cooling plate 160, and good cooling performance may be obtained. Thus, the highly reliable optical transmission device 1 may be obtained.

As the angles θ2 and θ3 increase, the size of the package substrate 110 may be reduced. However, the height of the optical transmission device 1 increases. When a balance between the size of the package substrate 110 and the height of the optical transmission device 1 is considered, the angles θ2 and θ3 are more preferably greater than or equal to 40° and smaller than or equal to 50°. In a case where a constraint on the height of the optical transmission device 1 is high, the angles θ2 and θ3 are more preferably greater than or equal to 10° and smaller than or equal to 30°.

Figure 17:
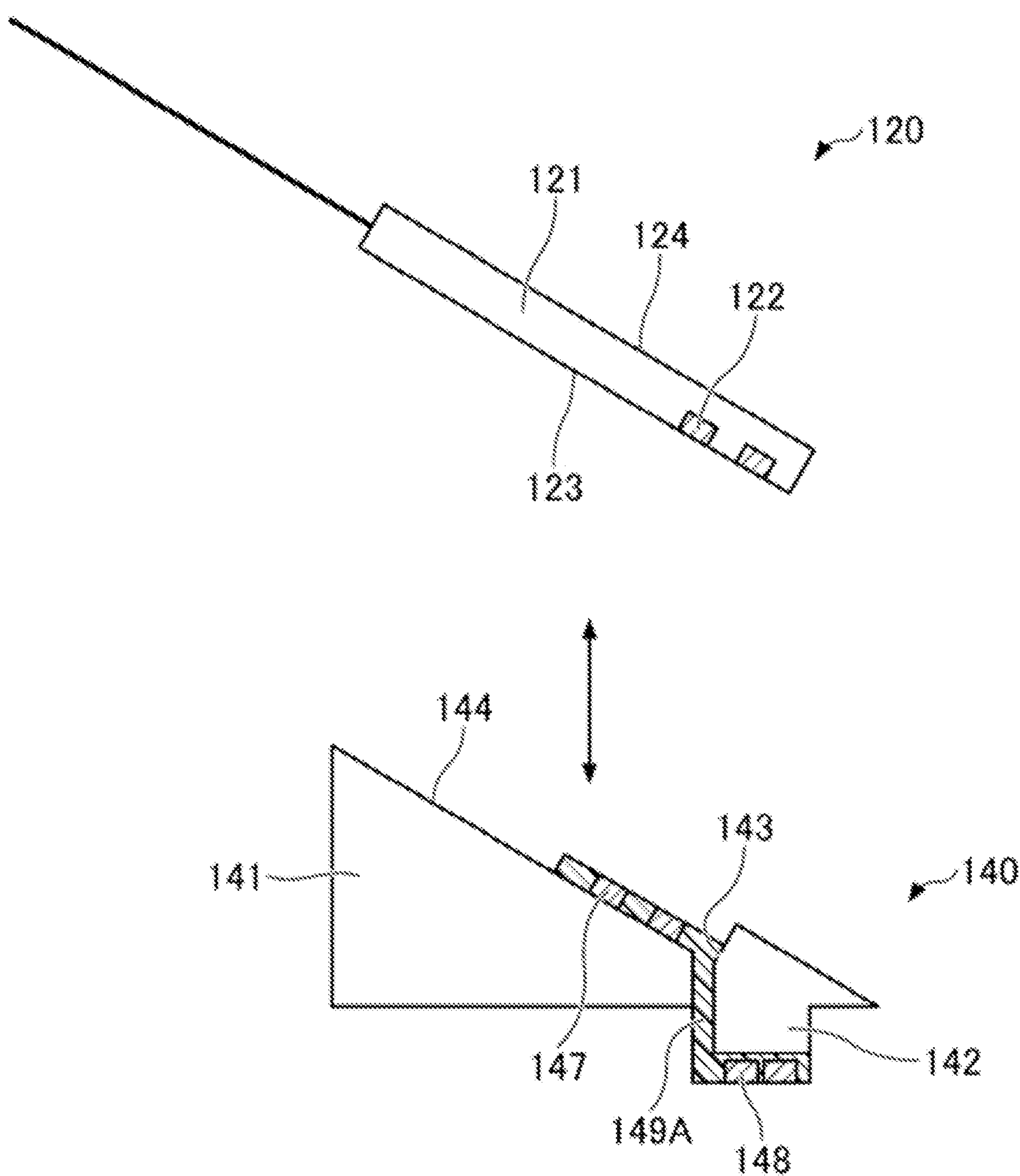
FIG. 17 is a sectional view illustrating another example of the third connector according to the first embodiment.

A flexible substrate may be used for coupling the terminals 147 and the terminals 148 to each other in the third connector 140. FIG. 17 is a sectional view illustrating another example of the third connector 140. As illustrated in FIG. 17, a flexible substrate 149A including the terminals 147 and 148 may be used. Although it is not illustrated, the flexible substrate 149A includes a wiring layer that couples the terminals 147 and the terminals 148 to each other. Likewise, a flexible substrate may be used for coupling the terminals 157 and the terminals 158 in the fourth connector 150. The wiring layer is an example of a conductive member.

Second Embodiment

Figure 18:
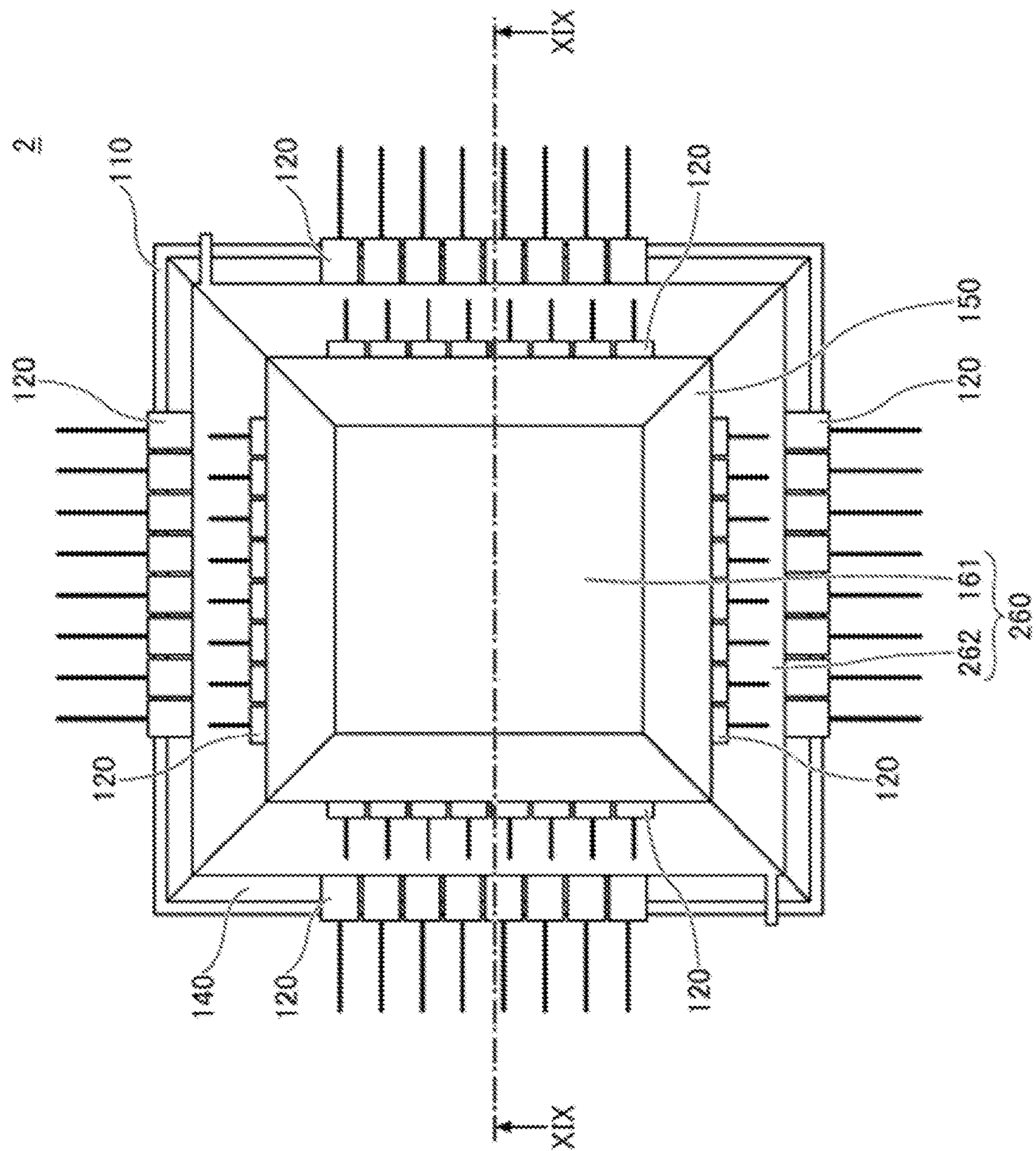
FIG. 18 is a top view illustrating an optical transmission device according to a second embodiment.
Figure 19:
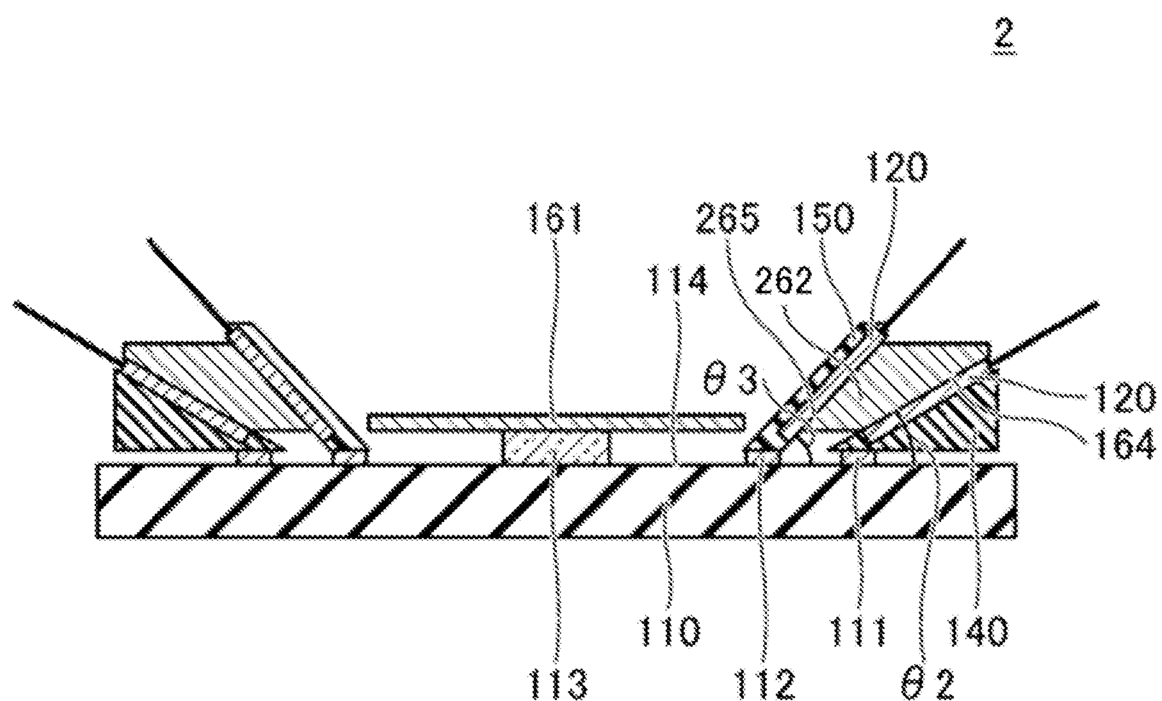
FIG. 19 is a sectional view illustrating the optical transmission device according to the second embodiment.

Next, a second embodiment is described. Mainly, there is a difference in the configuration of the cooling plate between the first embodiment and the second embodiment. FIG. 18 is a top view illustrating an optical transmission device according to the second embodiment. FIG. 19 is a sectional view illustrating the optical transmission device according to the second embodiment. FIG. 19 corresponds to a sectional view taken along line XIX-XIX of FIG. 18.

As illustrated in FIGS. 18 and 19, an optical transmission device 2 according to the second embodiment includes a cooling plate 260 instead of the cooling plate 160. The cooling plate 260 includes a second cooling unit 262 instead of the second cooling unit 162. In plan view, the second cooling unit 262 has a quadrilateral shape and has an annular shape surrounding the first cooling unit 161. As illustrated in FIG. 19, the second cooling unit 262 has inclined surfaces 164 and 265. The inclined surfaces 164 is inclined such that, in sectional view seen in the direction parallel to the upper surface 114, as the distance between the switch IC 113 and the inclined surface 164 reduces, the distance between the upper surface 114 and the inclined surface 164 reduces, and, in sectional view seen in the direction parallel to the upper surface 114, as the distance between the switch IC 113 and the inclined surface 265 reduces, the distance between the upper surface 114 and the inclined surface 265 reduces. The inclined surface 164 is closer to the upper surface 114 than the inclined surface 265. According to the present embodiment, an angle θ3 formed between the upper surface 114 and the inclined surface 265 is greater than an angle θ2 formed between the upper surface 114 and the inclined surface 164. The angles θ2 and θ3 are greater than 0° and smaller than 90°, and preferably, greater than or equal to 10° and smaller than or equal to 80°. The angles θ2 and θ3 are more preferably greater than or equal to 40° and smaller than or equal to 50°. In the case where the constraint on the height of the optical transmission device 1 is high, the angles θ2 and θ3 are more preferably greater than or equal to 10° and smaller than or equal to 30°. The inclined surface 265 is an example of the third surface.

Other configurations are similar to those of the first embodiment.

Also according to the second embodiment, effects similar to those of the first embodiment may be obtained. According to the second embodiment, the volume of the second cooling unit 262 may be increased compared to that according to the first embodiment. This may facilitate cooling of the optical module 120.

Third Embodiment

Figure 20:
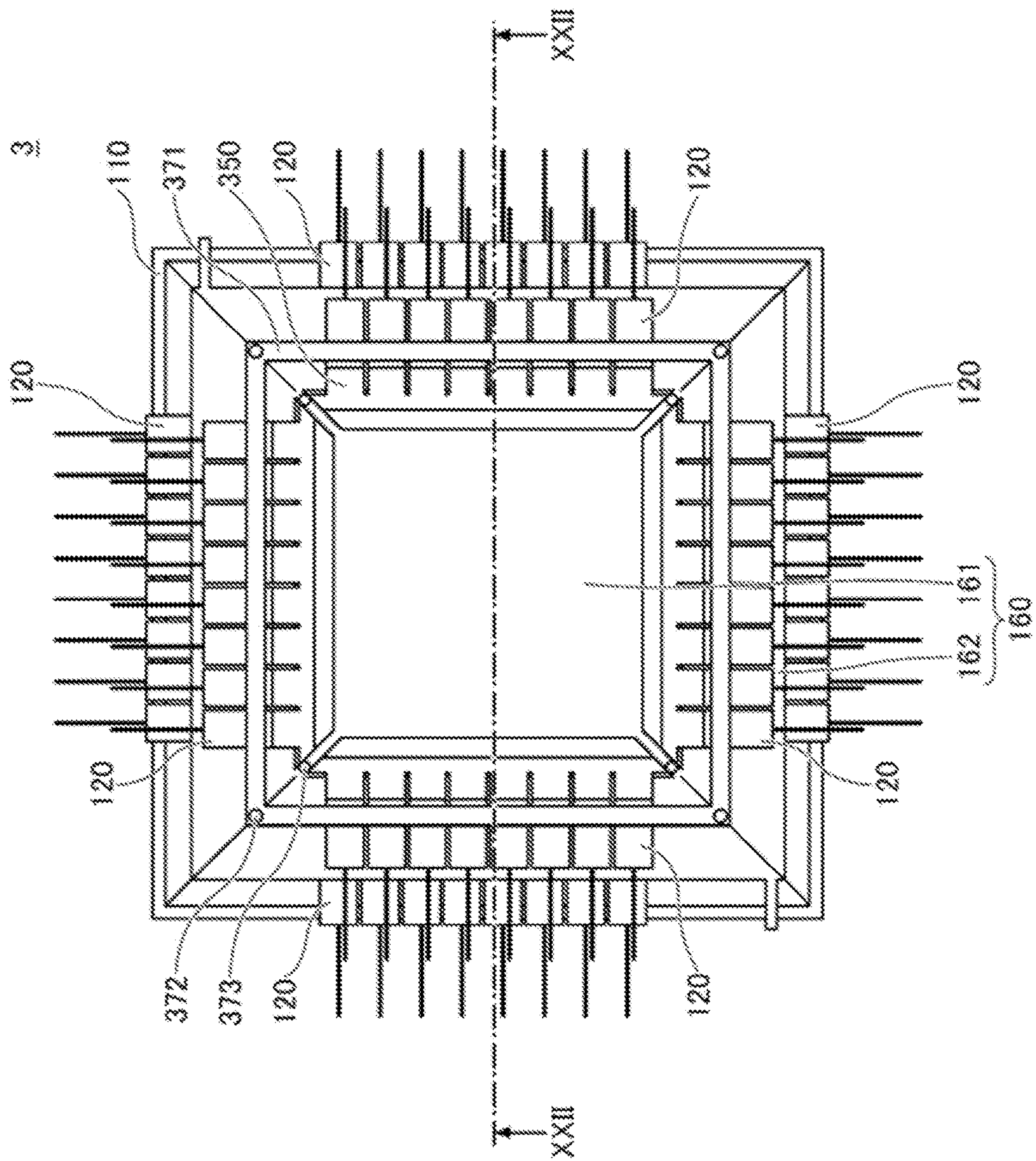
FIG. 20 is a top view illustrating an optical transmission device according to a third embodiment.
Figure 21:
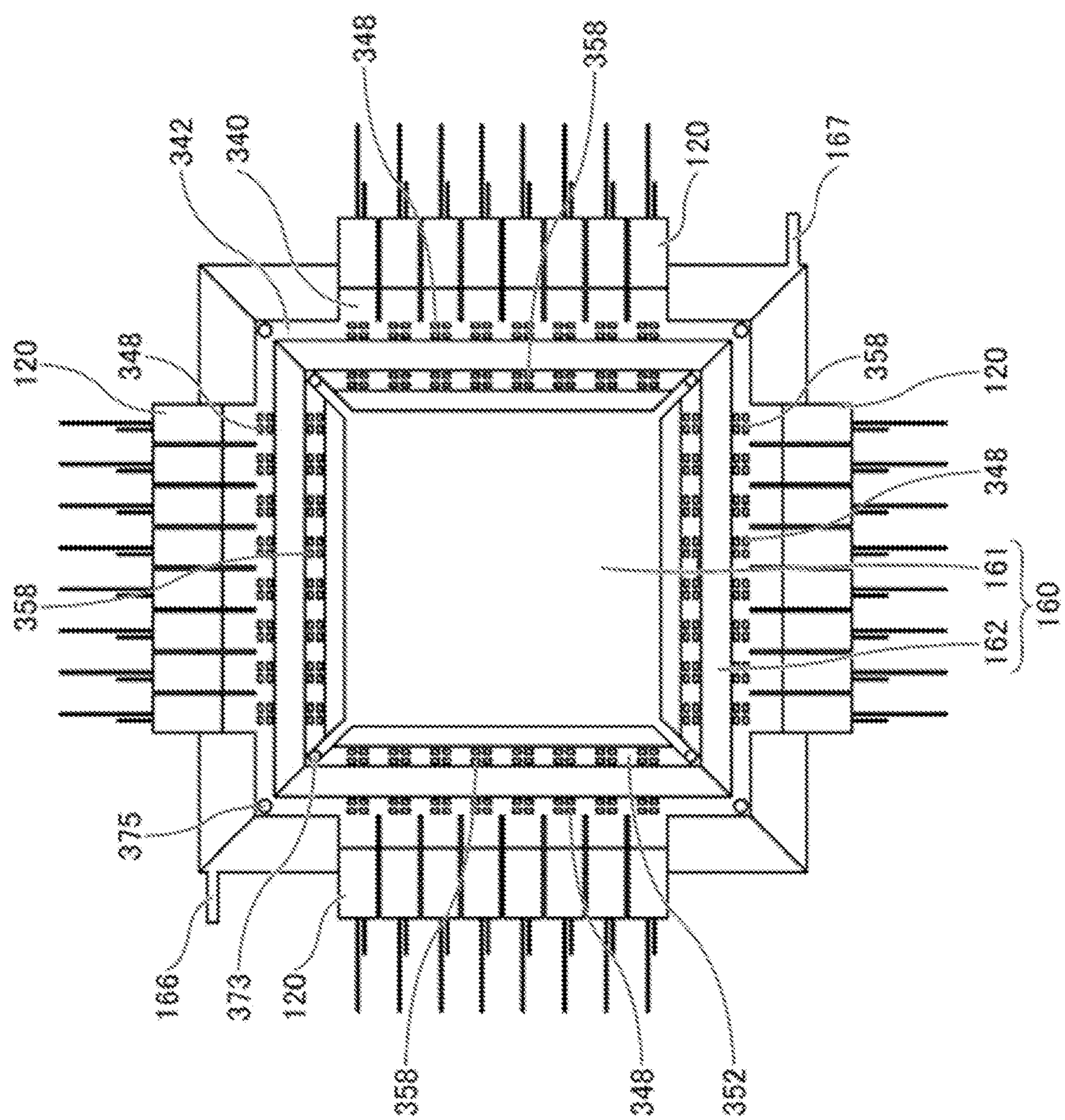
FIG. 21 is a bottom view illustrating a third connector, a fourth connector, and so forth according to the third embodiment.
Figure 22:
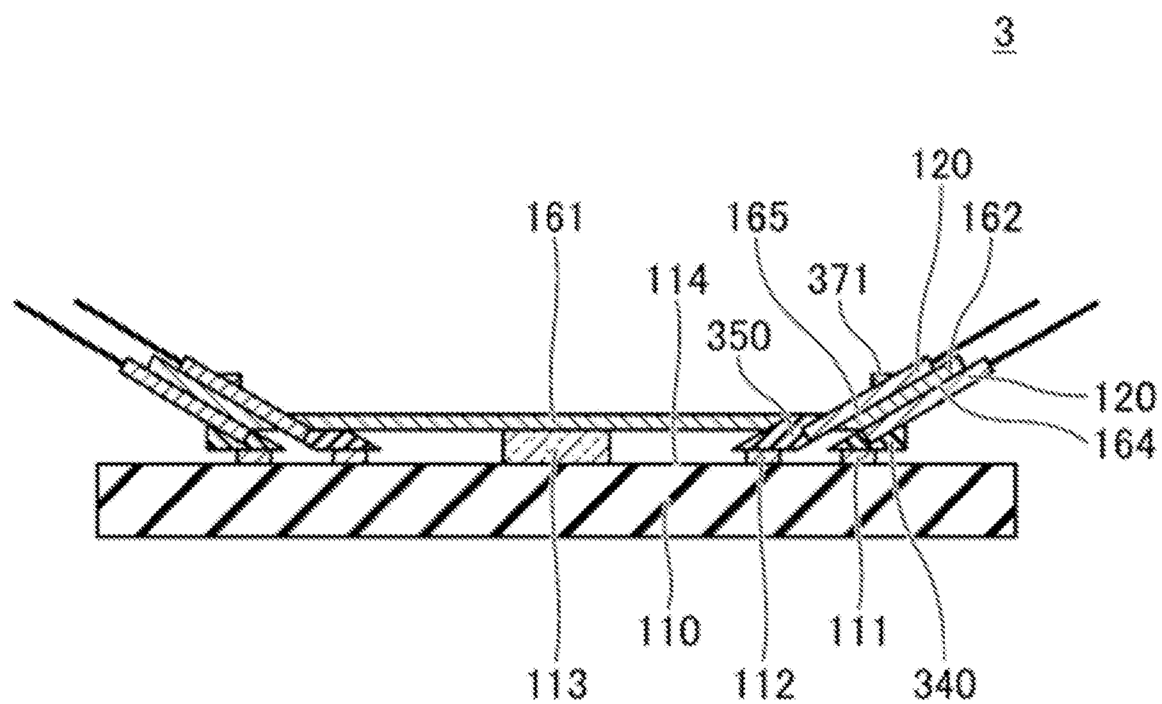
FIG. 22 is a sectional view illustrating the optical transmission device according to the third embodiment.
Figure 23:
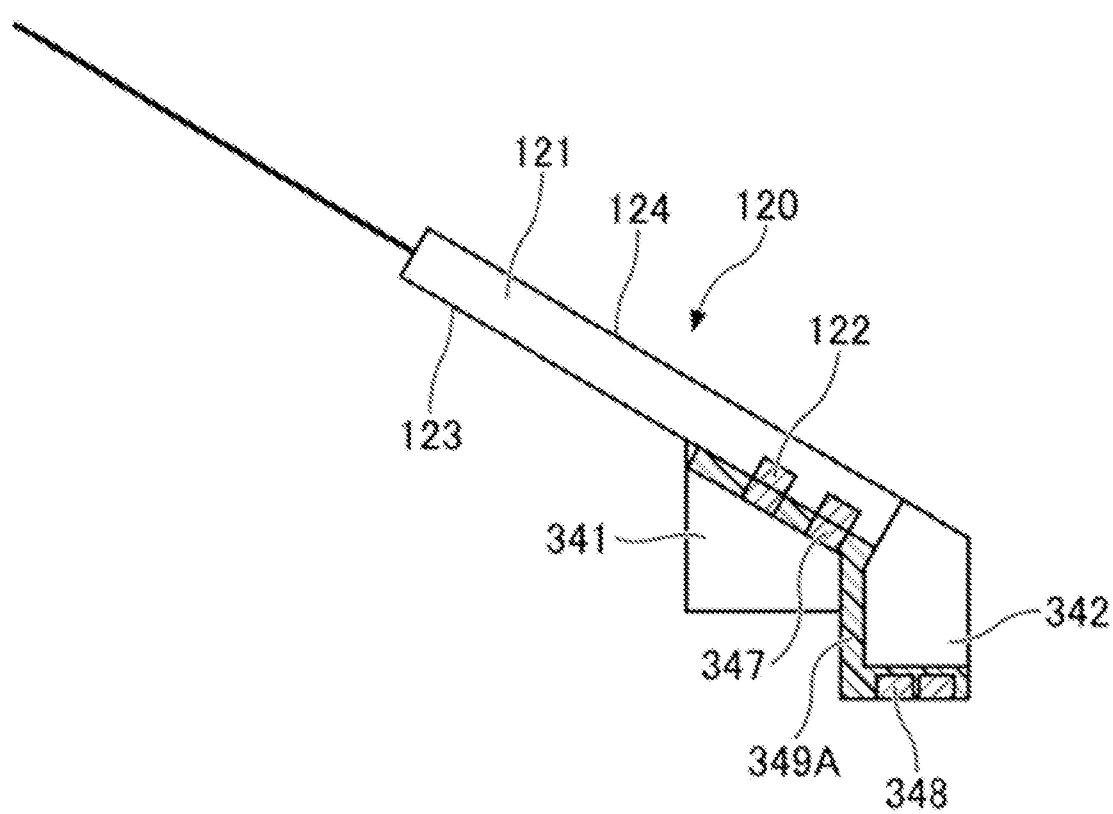
FIG. 23 is a sectional view illustrating the third connector according to the third embodiment.

Next, a third embodiment is described. Mainly, there is a difference in configuration of the third connector and the fourth connector between the first embodiment and the third embodiment. FIG. 20 is a top view illustrating an optical transmission device according to the third embodiment. FIG. 21 is a bottom view illustrating a third connector, a fourth connector, and so forth according to the third embodiment. FIG. 22 is a sectional view illustrating the optical transmission device according to the third embodiment. FIG. 23 is a sectional view illustrating the third connector according to the third embodiment. FIG. 22 corresponds to a sectional view taken along line XXII-XXII of FIG. 20.

As illustrated in FIGS. 20 to 23, an optical transmission device 3 according to the third embodiment includes a third connector 340 instead of the third connector 140 and a fourth connector 350 instead of the fourth connector 150.

The third connector 340 includes a base portion 341 and a projection portion 342. Examples of the material of the base portion 341 and the projection portion 342 include, for example, engineering plastics such as PPS, polyamide, PBT, and LCP. The projection portion 342 projects downward from the base portion 341. The third connector 340 includes a flexible substrate 349A including the terminals 347 and 348. The terminals 347 are coupled to the terminals 122 of the optical modules 120. The terminals 348 are provided in a lower surface of the projection portion 342 and coupled to the terminals of the first connectors 111. Although it is not illustrated, the flexible substrate 349A includes a wiring layer that couples the terminals 347 and the terminals 348 to each other. The projection portion 342 in which the terminals 348 are provided functions as a male connector inserted into the first connectors 111. The wiring layer is an example of the conductive member.

The fourth connector 350 includes a base portion, a projection portion 352 (see FIG. 24), and a flexible substrate. The flexible substrate includes terminals coupled to the terminals 122 of the optical modules 120, terminals 358 coupled to the terminals of the second connectors 112, and a wiring layer coupling these terminals to each other. The terminals 358 are provided in a lower surface of the projection portion 352. The projection portion 352 in which the terminals 358 are provided functions as a male connector inserted into the second connectors 112. The wiring layer is an example of the conductive member.

The optical transmission device 3 includes a support bar 371, screws 372, screws 373, and screws 375. The support bar 371 supports the optical modules included in the optical module groups 120B on the inclined surface 165 of the cooling plate 160. The screws 372 secure the support bar 371 to the cooling plate 160. The screws 373 secure the fourth connector 350 to the support bar 371. The screws 375 secure the third connector 340 to the cooling plate 160.

Other configurations are similar to those of the first embodiment.

A method of manufacturing the optical transmission device 3 according to the third embodiment is described.

Figure 24:
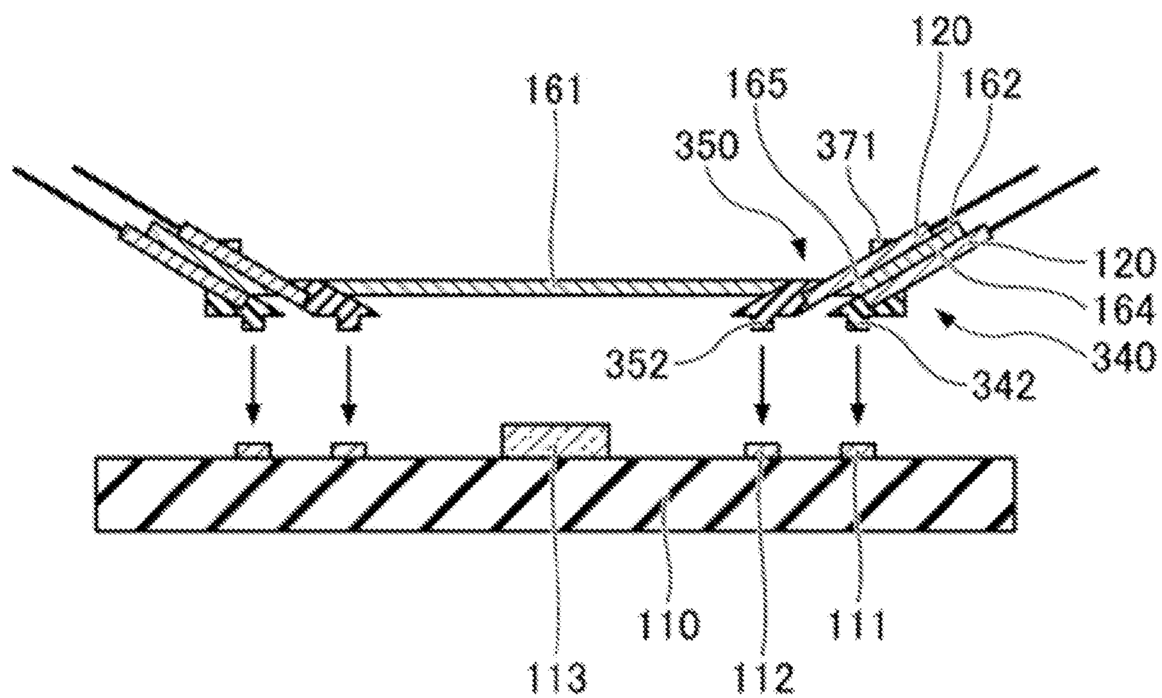
FIG. 24 is a sectional view illustrating a method of manufacturing the optical transmission device according to the third embodiment.

FIG. 24 is a sectional view illustrating the method of manufacturing the optical transmission device 3 according to the third embodiment.

First, as illustrated in FIG. 24, the package substrate 110 to which the first connectors 111 and the second connectors 112 are attached and over which the switch IC 113 is mounted is prepared. Furthermore, the cooling plate 160 to which the optical modules 120 included in the optical module groups 120A are secured by using the third connector 340 and to which the optical modules 120 included in the optical module groups 120B are secured by using the fourth connector 350 is prepared.

Next, the projection portion 342 of the third connector 340 together with the terminals 348 is inserted into the first connectors 111, and the projection portion 352 of the fourth connector 350 together with the terminals 358 is inserted into the second connectors 112. As a result, as illustrated in FIG. 22, the optical modules 120 included in the optical module groups 120A and the optical modules 120 included in the optical module groups 120B are mounted on the package substrate 110.

In this way, the optical transmission device 3 according to the third embodiment may be manufactured.

Also according to the third embodiment, effects similar to those of the first embodiment may be obtained. Furthermore, according to the third embodiment, the third connector 340 and the fourth connector 350 that have simple configurations may be used.

Fourth Embodiment

Figure 25:
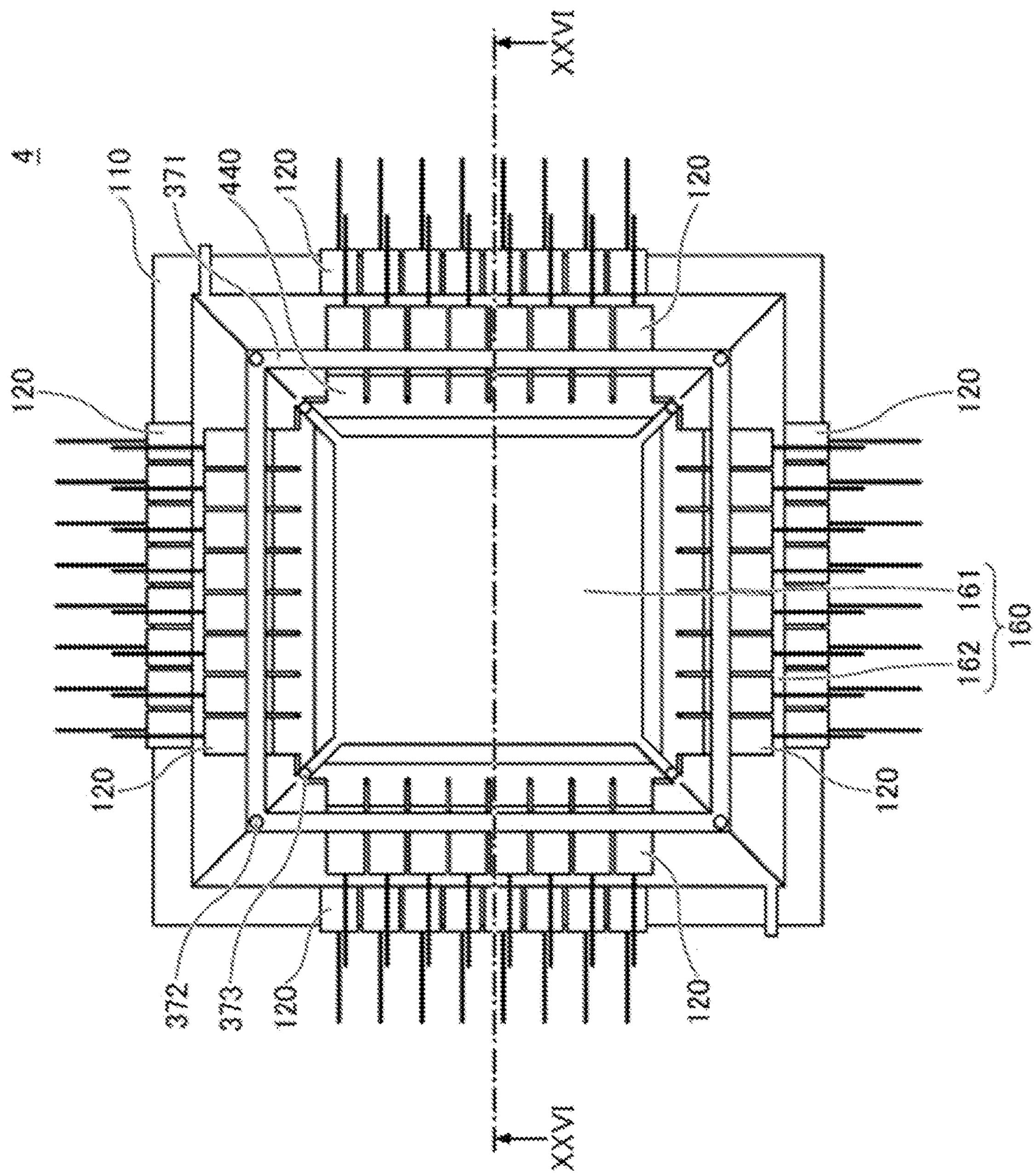
FIG. 25 is a top view illustrating an optical transmission device according to a fourth embodiment.
Figure 26:
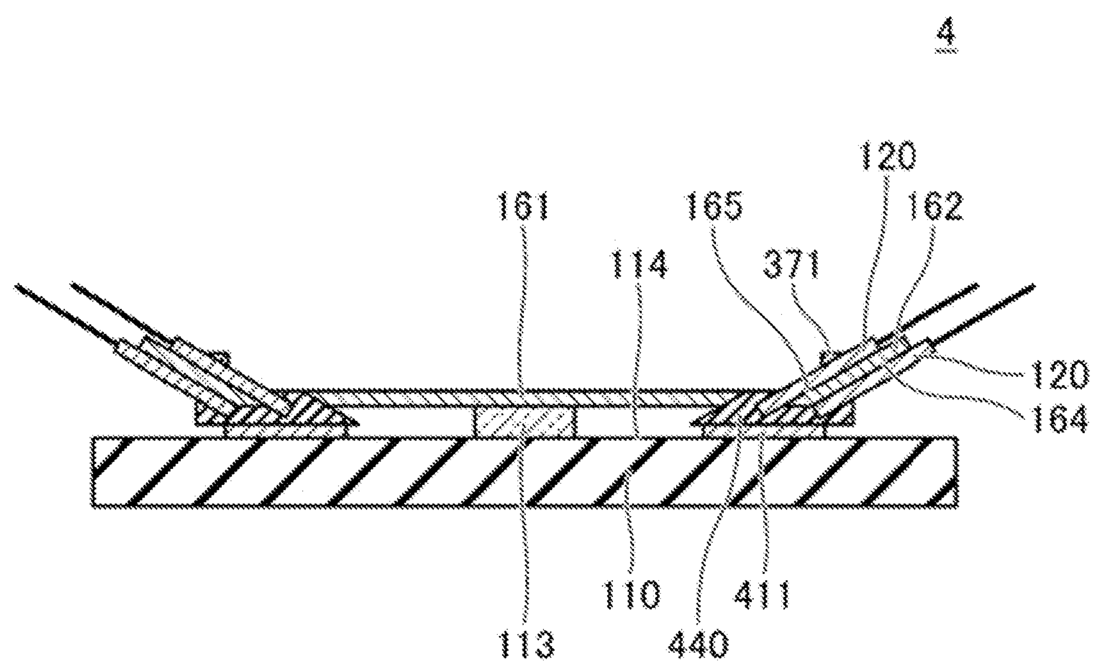
FIG. 26 is a sectional view illustrating the optical transmission device according to the fourth embodiment.
Figure 27:
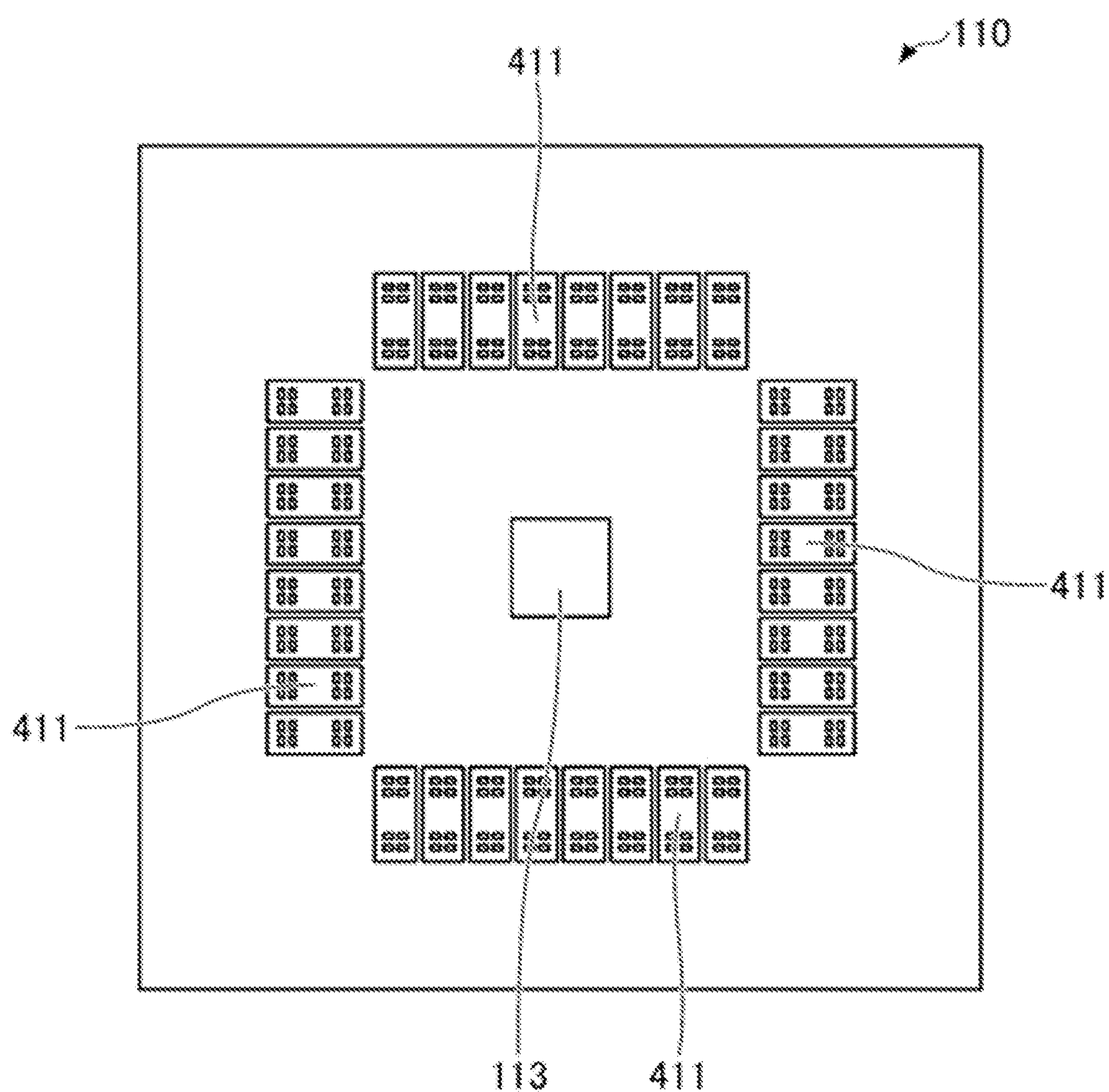
FIG. 27 is a top view illustrating the package substrate according to the fourth embodiment.

Next, a fourth embodiment is described. Mainly, there is a difference in configuration of the third connector and the fourth connector between the third embodiment and the fourth embodiment. FIG. 25 is a top view illustrating an optical transmission device according to the fourth embodiment. FIG. 26 is a sectional view illustrating the optical transmission device according to the fourth embodiment. FIG. 26 corresponds to a sectional view taken along line XXVI-XXVI of FIG. 25. FIG. 27 is a top view illustrating the package substrate according to the fourth embodiment.

As illustrated in FIGS. 25 to 27, an optical transmission device 4 according to the fourth embodiment includes a connector 440 instead of the third connector 340 and the fourth connector 350. The connector 440 has a configuration in which the third connector 340 and the fourth connector 350 are integrated with each other. The connector 440 includes a projection portion 442 (see FIG. 28) instead of the projection portions 342 and 352. The projection portion 442 has a configuration in which the projection portion 342 and the projection portion 352 are integrated with each other.

A plurality of connectors 411 having a configuration in which the first connectors 111 and the second connectors 112 are integrated with each other are attached to the upper surface 114 of the package substrate 110. The number of the connectors 411 is equal to the total number of the optical modules 120 included in the four optical module groups 120A and the total number of the optical modules 120 included in the four optical module groups 120B. The connectors 411 are coupled to the switch IC 113 via the package substrate 110. Each of the connectors 411 is, for example, a female connector. The plurality of connectors 411 form a quadrilateral shape in plan view seen in a direction perpendicular to the upper surface 114 and is disposed so as to form an annular shape surrounding the switch IC 113.

Other configurations are similar to those of the third embodiment.

Figure 28:
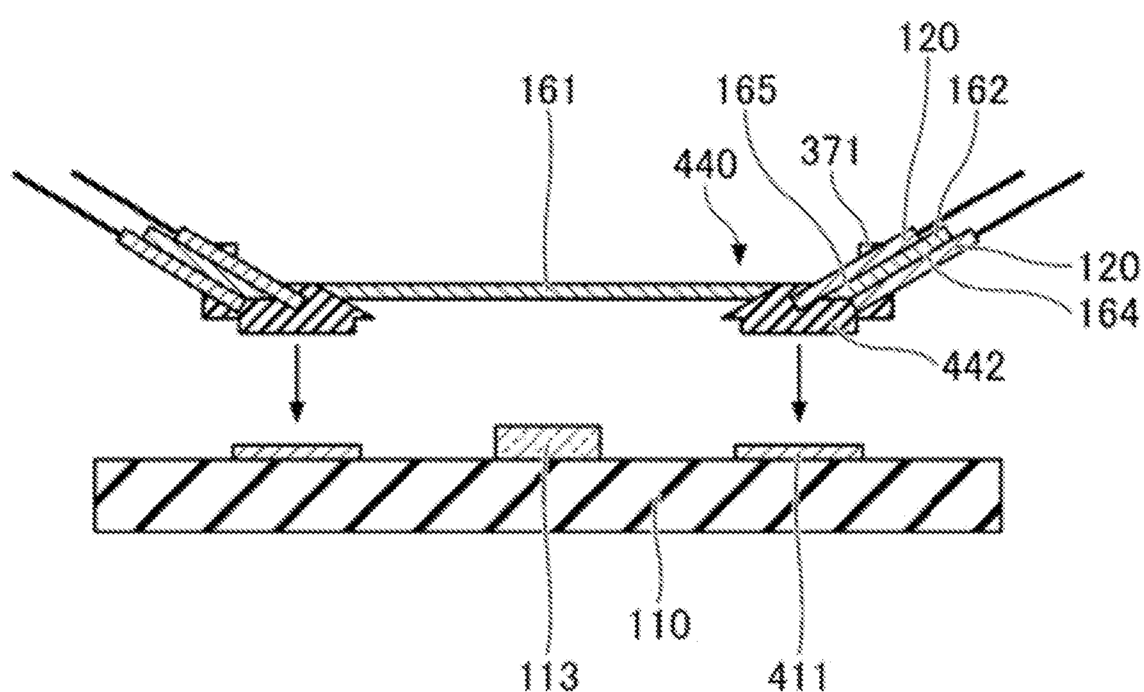
FIG. 28 is a sectional view illustrating a method of manufacturing the optical transmission device according to the fourth embodiment.

A method of manufacturing the optical transmission device 4 according to the fourth embodiment is described. FIG. 28 is a sectional view illustrating a method of manufacturing the optical transmission device 4 according to the fourth embodiment.

First, as illustrated in FIG. 28, the package substrate 110 to which the connectors 411 are attached and over which the switch IC 113 is mounted is prepared. Furthermore, the cooling plate 160 to which the optical modules 120 included in the optical module groups 120A and the optical modules 120 included in the optical module groups 120B are secured by using the connector 440 is prepared.

Next, the projection portion 442 of the connector 440 is inserted into the connectors 411 together with the terminals 348 and 358. As a result, as illustrated in FIG. 26, the optical modules 120 included in the optical module groups 120A and the optical modules 120 included in the optical module groups 120B are mounted on the package substrate 110.

In this way, the optical transmission device 4 according to the fourth embodiment may be manufactured.

Also according to the fourth embodiment, effects similar to those of the third embodiment may be obtained. Furthermore, according to the fourth embodiment, the number of connectors is reduced, and thereby coupling reliability is likely to be improved.

Although the preferred embodiments and the like have been described in detail above, the present disclosure is not limited to the above-described embodiments and the like. Various modifications and replacements may be made to the above-described embodiments and the like without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission device comprising:
- a wiring substrate that includes a first surface;
- a switch integrated circuit chip provided over the first surface;
- a first connector provided over the first surface and coupled to the switch integrated circuit chip via the wiring substrate;
- a second connector provided between the switch integrated circuit chip and the first connector and coupled to the switch integrated circuit chip via the wiring substrate;
- a first optical module electrically coupled to the first connector;
- a second optical module electrically coupled to the second connector; and
- a cooling plate that includes
- a first cooling unit that cools the switch integrated circuit chip, and
- a second cooling unit that cools the first optical module and the second optical module, wherein the second cooling unit includes a second surface and a third surface, the second surface is inclined such that, in sectional view seen in the direction parallel to the first surface, a distance between the first surface and the second surface reduces as a distance between the switch integrated circuit chip and the second surface reduces, and the third surface is inclined such that, in sectional view seen in a direction parallel to the first surface, a distance between the first surface and the third surface reduces as a distance between the switch integrated circuit chip and the third surface reduces, wherein the second surface is closer to the first surface than the third surface, wherein the first optical module is provided over the second surface, and wherein the second optical module is provided over the third surface.

2. The optical transmission device according to claim 1, further comprising:

a third connector provided between the first surface and the second surface, coupled to the first connector, and that includes a fourth surface inclined such that, in sectional view seen in the direction parallel to the first surface, as a distance between the switch integrated circuit chip and the fourth surface reduces, a distance between the first surface and the fourth surface reduces, wherein the first optical module is provided between the second surface and the fourth surface, and wherein the first optical module is coupled to the third connector and is electrically coupled to the first connector via the third connector.

3. The optical transmission device according to claim 2, wherein, in plan view seen in a direction perpendicular to the first surface, the third connector includes an annular shape that surrounds the switch integrated circuit chip, and wherein a plurality of first optical modules arranged in an annular shape are coupled to the third connector, the plurality of first optical modules including the first optical module.

4. The optical transmission device according to claim 1, further comprising:

a fourth connector provided over the third surface, coupled to the second connector, and that includes a fifth surface that is inclined such that, in sectional view seen in the direction parallel to the first surface, as a distance between the switch integrated circuit chip and the fourth surface reduces, a distance between the first surface and the fifth surface reduces, wherein the second optical module is provided between the third surface and the fifth surface, and wherein the second optical module is coupled to the fourth connector and is electrically coupled to the second connector via the fourth connector.

5. The optical transmission device according to claim 4, wherein, in plan view seen in a direction perpendicular to the first surface, the fourth connector includes an annular shape that surrounds the switch integrated circuit chip, and wherein a plurality of second optical modules arranged in an annular shape are coupled to the fourth connector, the plurality of second optical modules including the second optical module.

6. The optical transmission device according to claim 1, wherein an angle formed between the first surface and the third surface is greater than an angle formed between the first surface and the second surface.

7. The optical transmission device according to claim 1, wherein an angle formed between the first surface and the second surface is greater than or equal to 10° and smaller than or equal to 80°.

8. The optical transmission device according to claim 7, wherein an angle formed between the first surface and the second surface is greater than or equal to 40° and smaller than or equal to 50°.

9. The optical transmission device according to claim 7, wherein an angle formed between the first surface and the second surface is greater than or equal to 10° and smaller than or equal to 30°.

10. The optical transmission device according to claim 1, wherein the first connector and the second connector are integrated with each other.

11. An optical transmission device comprising:

a wiring substrate that includes a mounting surface;

a switch integrated circuit chip provided over the mounting surface;

a plurality of optical modules connected to the switch integrated circuit chip via the wiring substrate; and a cooling plate that cools the switch integrated circuit chip and the plurality of optical modules, wherein the cooling plate includes a first cooling surface and a second cooling surface to cool the plurality of optical modules, the first cooling surface being inclined such that a first angle formed between the mounting surface and the first cooling surface is greater than or equal to 10° and smaller than or equal to 80°, the second cooling surface being inclined such that a second angle formed between the mounting surface and the second cooling surface is greater than or equal to 10° and smaller than or equal to 80°, and the second cooling surface being mounted above the first cooling surface.

12. The optical transmission device according to claim 11, wherein the first angle and the second angle are equal.

13. The optical transmission device according to claim 11, wherein the cooling plate includes a third cooling surface to cool the switch integrated circuit chip, the third cooling surface being parallel to the mounting surface.

14. The optical transmission device according to claim 11, wherein the cooling plate is sandwiched between a first subset of the plurality of optical modules adjacent to the first cooling surface and a second subset of the plurality of optical modules adjacent to the second cooling surface.

15. The optical transmission device according to claim 11, wherein each of the first cooling substrate and the second cooling substrate are inclined such that a portion of the first cooling surface and a portion of the second cooling surface is closest to the switch integrated circuit is also closest to the mounting substrate.

16. A cooling plate for an optical transmission device having a switch integrated circuit chip, a plurality of optical modules, and wiring substrate connecting the integrated circuit chip and the plurality of optical modules, the cooling plate comprising:

a first cooling unit that cools the switch integrated circuit chip; and a second cooling unit that cools a first optical module and a second optical module, wherein the second cooling unit includes a second surface and a third surface, the second surface being inclined such that, in sectional view seen in the direction parallel to the first surface, a distance between the first surface and the second surface reduces as a distance between the switch integrated circuit chip and the second surface reduces, and the third surface is inclined such that, in sectional view seen in a direction parallel to the first surface, a distance between the first surface and the third surface reduces as a distance between the switch integrated circuit chip and the third surface reduces, wherein the second surface is closer to the first surface than the third surface, wherein the first optical module is provided over the second surface, and wherein the second optical module is provided over the third surface.

* * * * *